(12) United States Patent
Sharma et al.

(10) Patent No.: US 11,415,808 B1
(45) Date of Patent: Aug. 16, 2022

(54) ILLUMINATION DEVICE WITH ENCAPSULATED LENS

(71) Applicant: Facebook Technologies, LLC, Menlo Park, CA (US)

(72) Inventors: Robin Sharma, Redmond, WA (US); Andrew John Ouderkirk, Redmond, WA (US); Christopher Yuan Ting Liao, Seattle, WA (US); Qi Zhang, Kirkland, WA (US); Tanya Malhotra, Redmond, WA (US); Karol Constantine Hatzillias, Kenmore, WA (US); Maik Scheller, Redmond, WA (US); Sheng Ye, Redmond, WA (US); Gregory Olegovic Andreev, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 243 days.

(21) Appl. No.: 16/720,024

(22) Filed: Dec. 19, 2019

Related U.S. Application Data

(60) Provisional application No. 62/803,001, filed on Feb. 8, 2019.

(51) Int. Cl.
*G02B 27/09* (2006.01)
*G06F 3/01* (2006.01)
*G06T 19/00* (2011.01)

(52) U.S. Cl.
CPC ..... *G02B 27/0955* (2013.01); *G02B 27/0916* (2013.01); *G06F 3/013* (2013.01); *G06T 19/006* (2013.01)

(58) Field of Classification Search
CPC ............................ G02B 27/0955; G06F 3/013
See application file for complete search history.

(56) References Cited

U.S. PATENT DOCUMENTS

| 10,564,427 B2 | 2/2020 | Ouderkirk et al. |
| 2008/0069168 A1 | 3/2008 | Kim et al. |

(Continued)

FOREIGN PATENT DOCUMENTS

WO 2019/020395 A1 1/2019

OTHER PUBLICATIONS

Moench et al., "VCSEL arrays with integrated optics", Proceedings of the SPIE, vol. 8639, Article No. 86390M, Mar. 13, 2013, pp. 1-10.

(Continued)

*Primary Examiner* — Shivang I Patel
(74) *Attorney, Agent, or Firm* — FisherBroyles, LLP

(57) ABSTRACT

An example device may include a light source, an optical element, and an encapsulant layer. A light beam generated by the light source may be received by the optical element, and redirected into the encapsulant layer. The optical element may include a high-index material, for example, with a refractive index of at least approximately 1.5 at the wavelength of the light beam. The light source may be a semiconductor light source, such as a light emitting diode or a laser. The optical element may be embedded in the encapsulant layer, and the optical element may have a curved exit surface. Refraction at the exit surface of the optical element may redirect the light beam towards a target. In some examples, the curvature of a freeform exit surface may be configured to improve the uniformity of target illumination

19 Claims, 17 Drawing Sheets

(56) References Cited

U.S. PATENT DOCUMENTS

| | | | |
|---|---|---|---|
| 2014/0104572 A1 | 4/2014 | Sharma et al. | |
| 2015/0098216 A1 | 4/2015 | Hatzilias et al. | |
| 2018/0038944 A1 | 2/2018 | Hellmig et al. | |
| 2018/0203247 A1 | 7/2018 | Chen et al. | |
| 2018/0277523 A1* | 9/2018 | Ahmed | H01L 25/0753 |
| 2019/0101767 A1 | 4/2019 | Geng et al. | |
| 2019/0361523 A1* | 11/2019 | Sharma | G02B 27/0955 |
| 2020/0150408 A1 | 5/2020 | Fard et al. | |
| 2020/0153203 A1 | 5/2020 | Hatzilias et al. | |
| 2020/0153204 A1 | 5/2020 | Hatzilias et al. | |

OTHER PUBLICATIONS

Wang et al., "High power and good beam quality of two-dimensional VCSEL array with integrated GaAs microlens array", Optics Express, vol. 18, No. 23, Oct. 29, 2010, pp. 23900-23905.

Wang et al., "High-Power Large-Aperture Bottom-Emitting 980-nm VCSELs with Integrated GaAs Microlens", IEEE Photonics Technology Letters, vol. 21 No. 4, Feb. 15, 2009, pp. 239-241.

Gimkiewicz et al., "Wafer-scale replication and testing of micro-optical components for VCSELs", Proceedings of SPIE, vol. 5453, No. 2, Sep. 8, 2004, pp. 13-26.

Iga, Kenichi, "Parallel Photonics: Based on VCSEL and Microphotonics Array", IEEE/LEOS International Conference on Optical MEMS, Article No. 1233438, Aug. 18, 2003, pp. 3-4.

Liu et al., "Chip-scale Integration of VCSEL, Photodetector, and Microlens Arrays", Proceedings of SPIE, vol. 4652, Jun. 3, 2002, pp. 11-18.

Fu, Yongqi, "Integration of Microdiffractive Lens with Continuous Relief with Vertical-Cavity Surface-Emitting Lasers Using Focused Ion Beam Direct Milling", IEEE Photonics Technology Letters, vol. 13, No. 5, May 1, 2001, pp. 424-426.

Strzelecka et al., "Monolithic Integration of an Array of Multiple-Wavelength Vertical-Cavity Lasers with a Refractive Microlens for Optical Interconnections", IEEE Lasers and Electro-Optics Society, vol. 2, Nov. 18, 1996, pp. 271-272.

Raddatz et al., "Measurement of Guiding Effects in Vertical-Cavity Surface-Emitting Lasers", IEEE Photonics Technology Letters, vol. 8, No. 6, Jun. 1, 1996, pp. 743-745.

* cited by examiner

| Terms | Coefficients |
|---|---|
| X | -0.3509 |
| Y | 0 |
| X2 | -2.8675 |
| XY | 0 |
| Y2 | 2.1512 |
| X3 | -52.3765 |
| X2Y | 0 |
| XY2 | -11.8921 |
| Y3 | 0 |
FIG. 12A
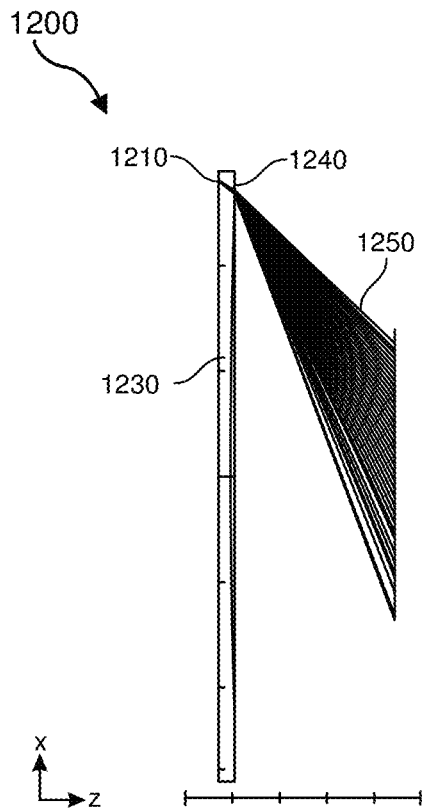
FIG. 12B
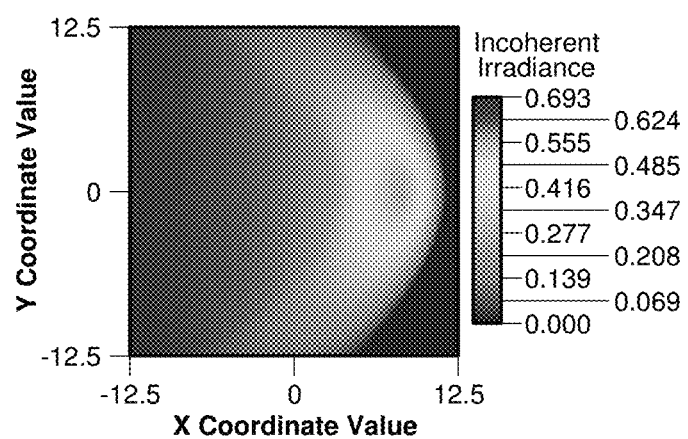
FIG. 12C

| Terms | Coefficients |
|---|---|
| X | -0.3413 |
| Y | 0 |
| X2 | -2.8332 |
| XY | 0 |
| Y2 | 2.1295 |
| X3 | -63.2523 |
| X2Y | 1.1633 |
| XY2 | -11.4578 |
| Y3 | 0.4151 |
| X4 | -66.3194 |
| X3Y1 | 73.766 |
| X2Y2 | 88.1097 |
| X1Y3 | -3.0227 |
| Y4 | 5.8244 |

| Terms | |
|---|---|
| X | -0.104 |
| Y | 0 |
| X2 | 3.243 |
| XY | 0 |
| Y2 | 4.725 |
| X3 | -25.961 |
| X2Y | 0 |
| XY2 | 10.797 |
| Y3 | 0 |

| Terms | |
|---|---|
| X | -0.314 |
| Y | 0 |
| X2 | 0.25 |
| XY | 0 |
| Y2 | 4.069 |
| X3 | 15.931 |
| X2Y | 1.545 |
| XY2 | 132.647 |
| Y3 | 9.588 |

| Terms | Coeff |
|---|---|
| X | -0.258 |
| Y | 0 |
| X2 | 0.831 |
| XY | 0 |
| Y2 | 2.933 |
| X3 | -28.950 |
| X2Y | 0 |
| XY2 | 130.69 |
| Y3 | 0 |

ILLUMINATION DEVICE WITH ENCAPSULATED LENS

CROSS REFERENCE TO RELATED APPLICATION

This application claims the benefit of U.S. Provisional Application No. 62/803,001, filed Feb. 8, 2019, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIGS. 12A-12E illustrate freeform curved surface coefficients of optical element exit surfaces, along with radial locations of the light source/optical element combinations, and illustrative representations of illumination uniformity.

FIGS. 13A-13E illustrate freeform curved surface coefficients of optical element exit surfaces, along with radial locations of the light source/optical element combinations, and illustrative representations of illumination uniformity.

Figure 1:
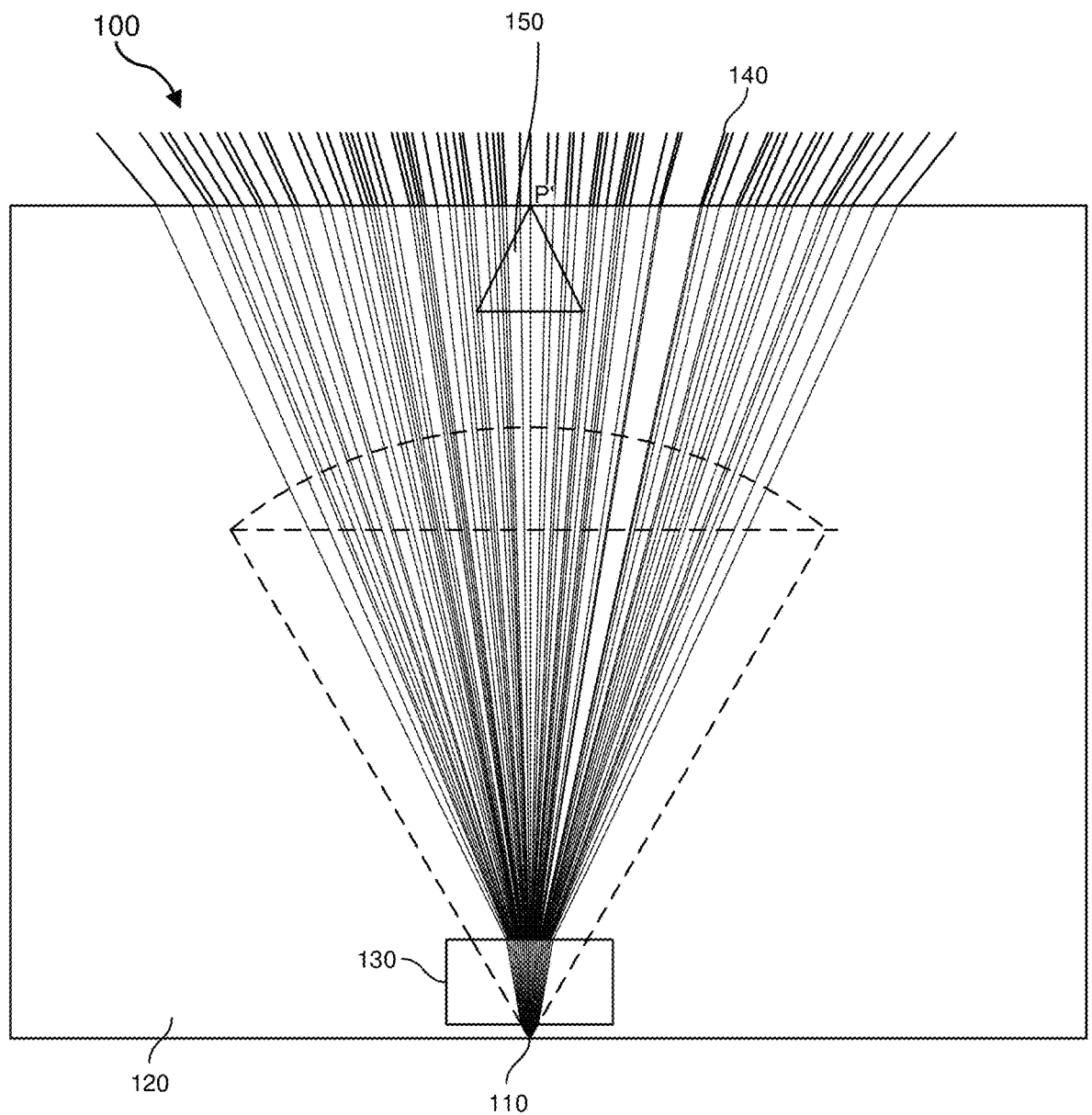
FIG. 1 is a schematic of a device including a light source, an optical element, and an encapsulant layer.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and are described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

A light source, such as a laser, may emit a light beam having various properties, such as beam direction and beam profile. As is described in greater detail below, examples of the present disclosure describe various methods and apparatuses for modifying light beam properties, for example, to improve the uniformity of illumination of a target.

Example applications of the concepts described in the present disclosure include optical devices, such as a device including an encapsulated optical element (e.g., an encapsulated lens), and devices and methods related to modifying the properties of a light beam emitted by a light source. In some examples, such a device may include an optical element encapsulated by, adjacent, or substantially adjacent an optical medium. The optical element may have a refractive index greater than that of the optical medium (or surrounding encapsulant layer including the optical medium). Additional examples of the present disclosure may include optical devices, such as devices including one or more light sources and/or optical elements.

Examples of the present disclosure may also include high refractive index optical elements, that may be used for beam shaping and/or beam steering of light beams from light sources, such as those used in eye-tracking systems. In some examples, the optical element and (optionally) the light source are embedded in an encapsulant layer having an intermediate refractive index. The encapsulant layer (that may also be referred to simply as an "encapsulant" for conciseness) may, for example, include an optical medium such as a generally transparent polymer. In some examples, a high refractive index optical element may include an optical medium (such as a semiconductor, or dielectric material) having a refractive index greater than approximately 1.5, in some examples, greater than approximately 2, and in some examples, a refractive index of approximately 3 or greater. The encapsulant layer may include an optical medium, such as an optical polymer, having a refractive index that may be less than that of the high refractive index optical element. For example, the encapsulant layer may have a refractive index of between approximately 1.3 and approximately 1.8, such as approximately 1.5. The high refractive index optical element may include a complex surface form, such as an anamorphic aspheric surface. In some examples, modeling showed improved illumination uniformity of the eye, even for high projection angles, for optical elements having an aspheric curved exit surface. For example, a light beam from a light source may be directed towards the center of the eyebox from large lateral displacements, for example, from near the frame of augmented reality glasses, with improved illumination uniformity of the eyebox. In some examples, a high refractive index optical element may include gallium phosphide (GaP), though other materials may be used (e.g., other phosphides, arsenides, nitrides, oxides, and the like). In some applications, the light sources may be part of augmented or virtual reality headware, such as LEDs or lasers embedded in the lenses or frames of augmented reality glasses. In some examples, the optical configurations may help prevent total internal reflection (TIR) within optical system components, which can create unwanted stray glare. In some examples, the angular distribution of directed light may have a sharp cut-off before TIR effects occur.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 2:
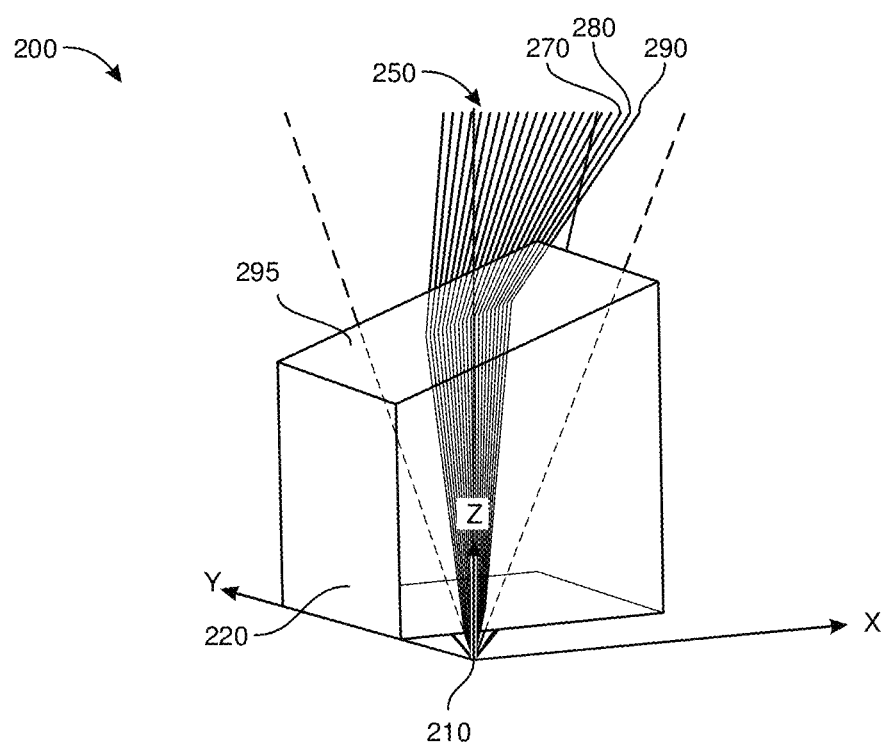
FIG. 2 illustrates an optical element with a prismatic exit surface.
Figure 3:
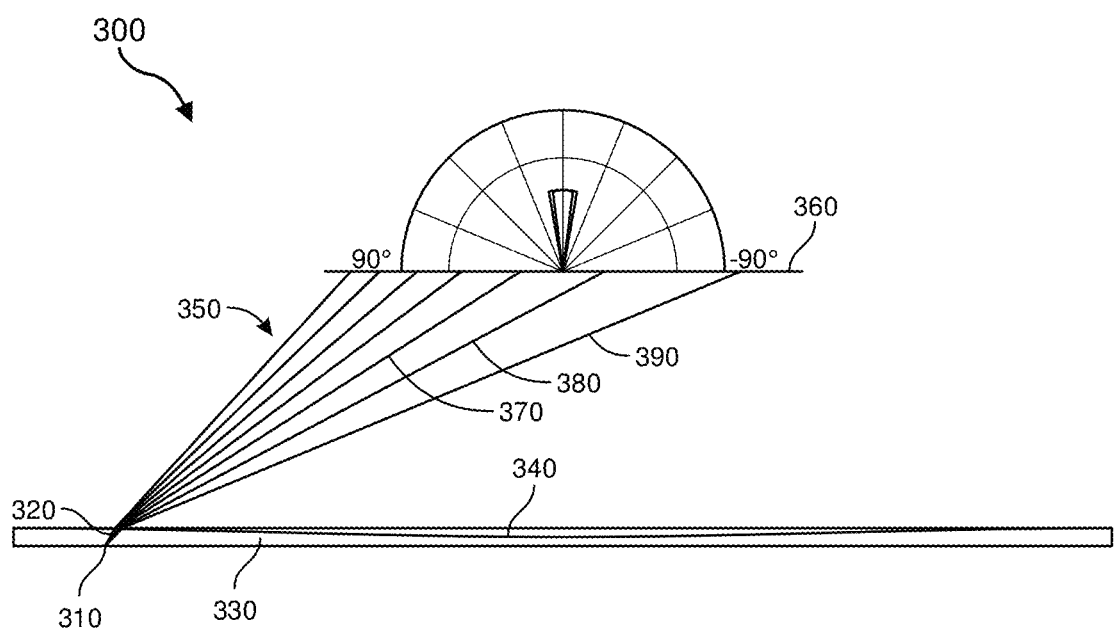
FIG. 3 illustrates the illumination of a target from an oblique angle.
Figure 4A:
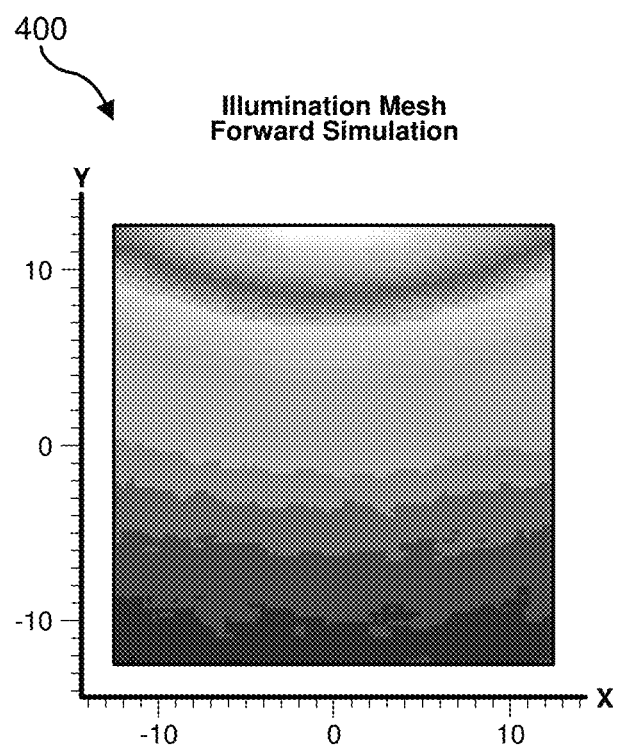
FIGS. 4A-4B qualitatively illustrate the illumination uniformity of a target.
Figure 4B:
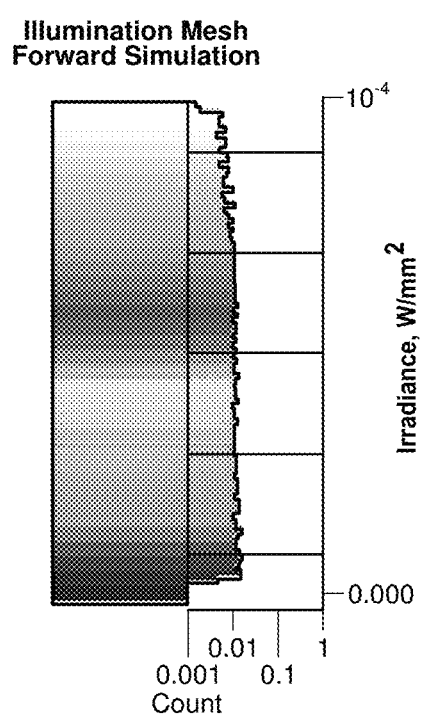
Figure 5:
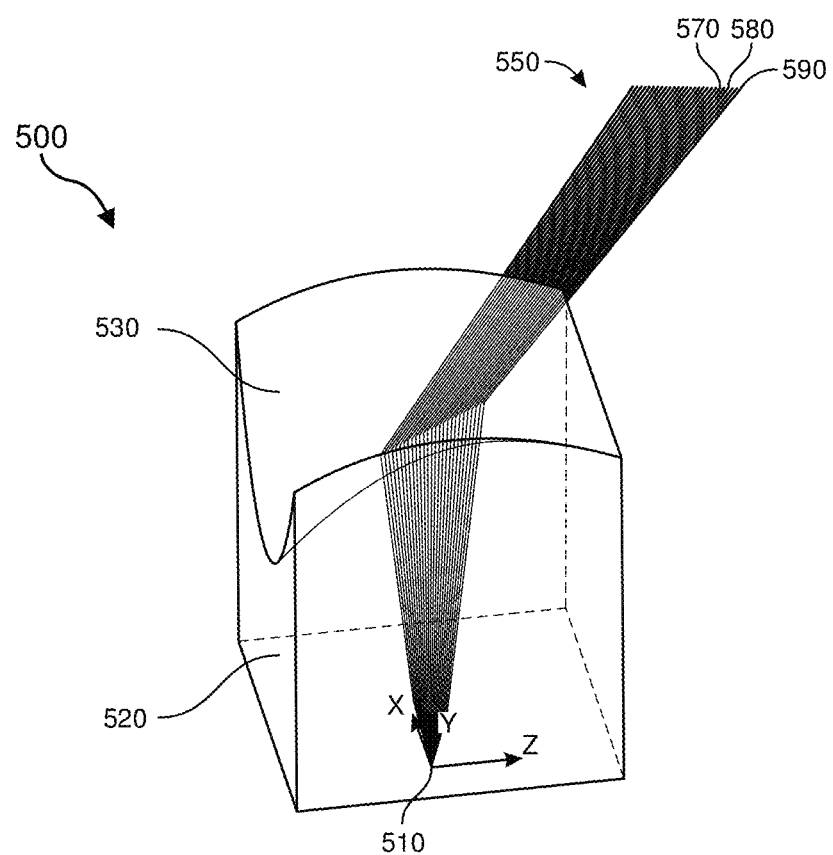
FIG. 5 shows an example optical element with an aspheric curved exit surface.
Figure 6:
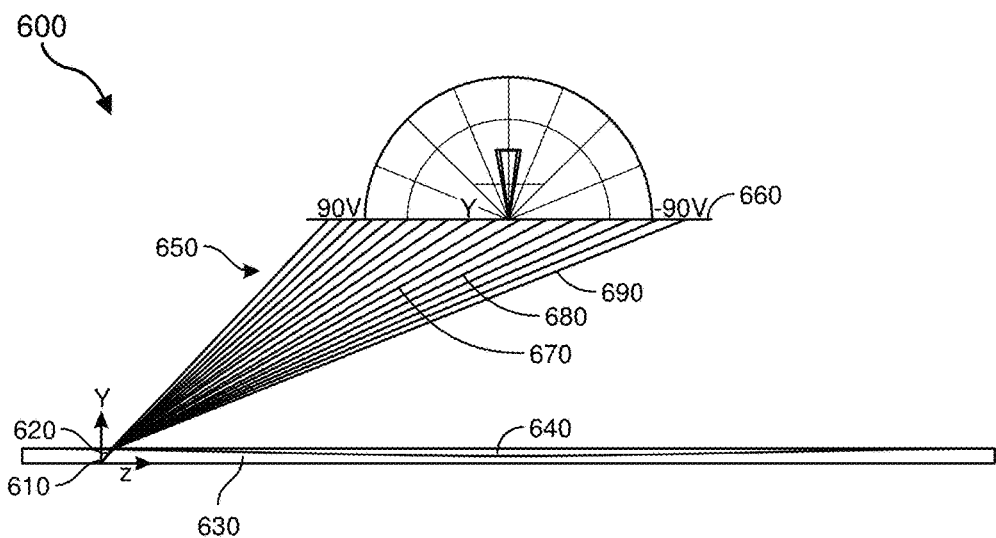
FIG. 6 illustrates illumination from an oblique angle, with improved illumination uniformity using an optical element with an aspheric curved exit surface.
Figure 7A:
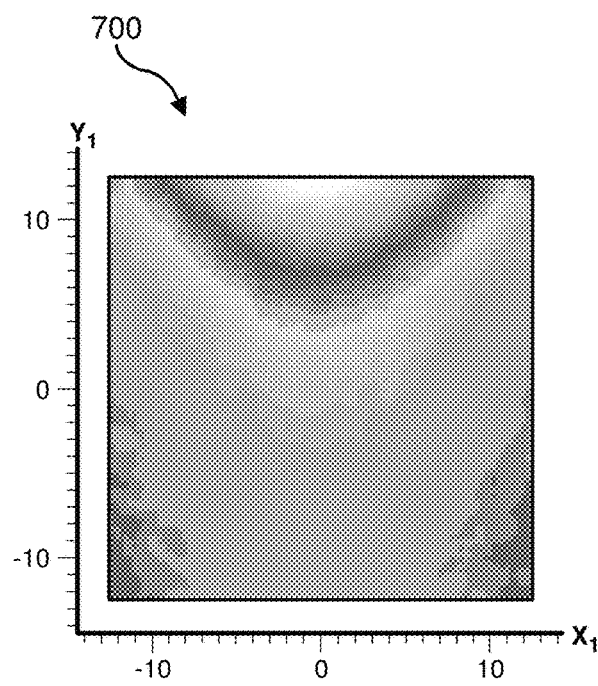
FIGS. 7A-7B further qualitatively illustrate illumination uniformity.
Figure 7B:
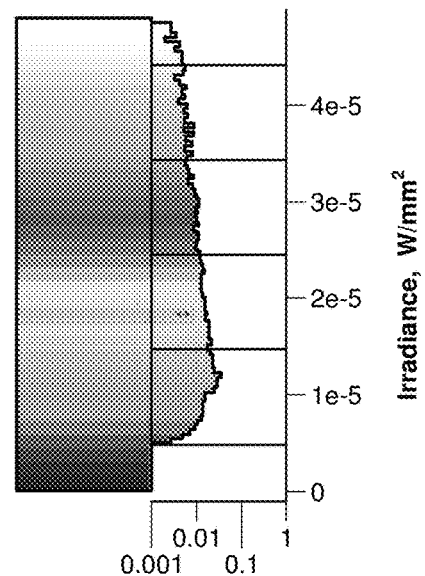
Figure 8:
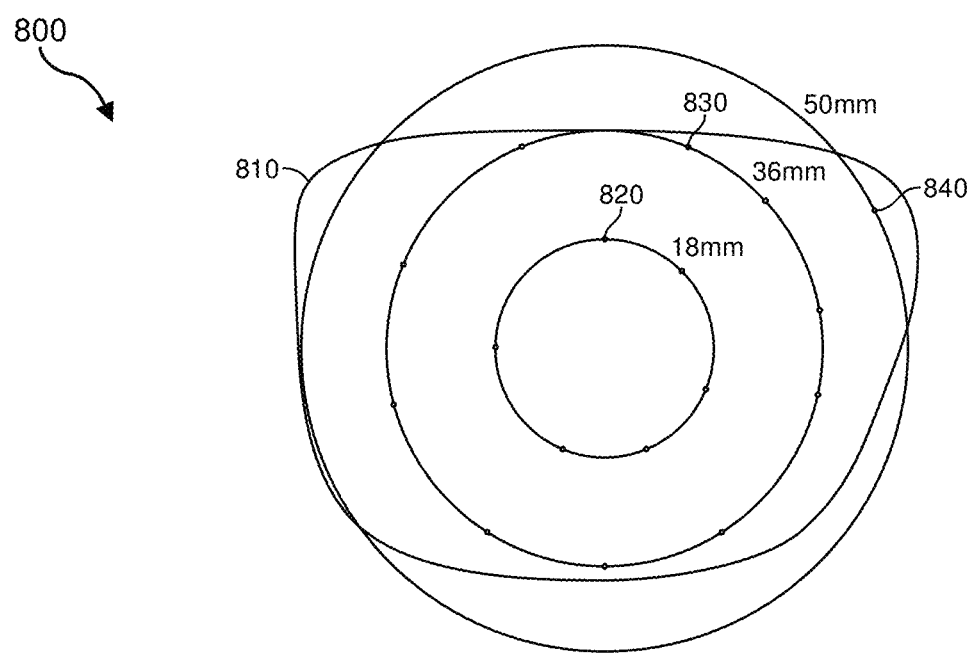
FIG. 8 illustrates possible locations of light source and optical element combinations at locations of predetermined radial separation from the optical center of the lens.
Figure 9:
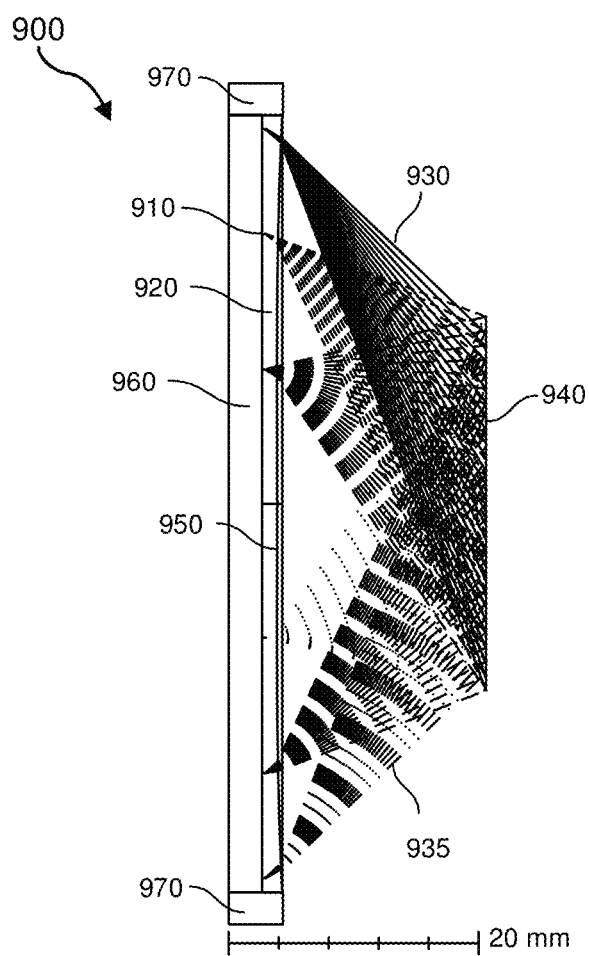
FIG. 9 illustrates illumination of an eyebox using a plurality of light source/optical element combinations arranged at different radial distances from the optical center of the lens.
Figure 10:
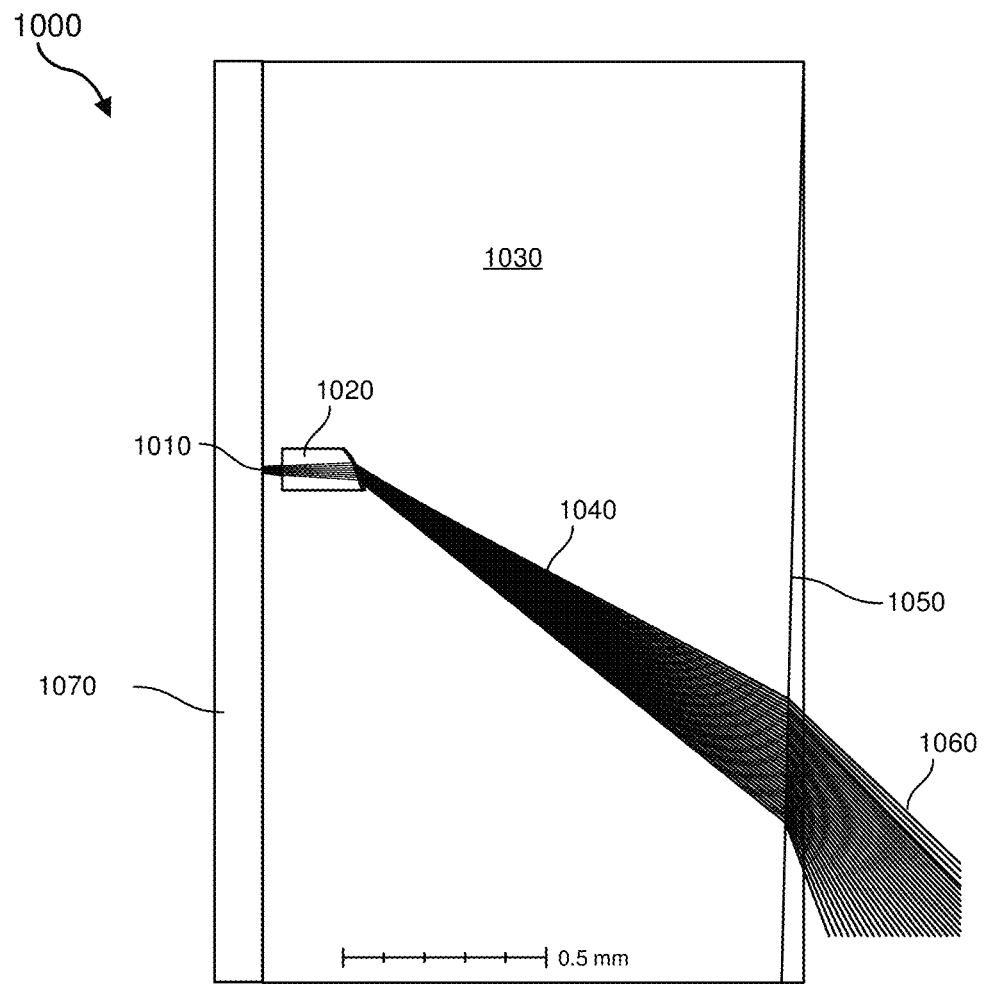
FIG. 10 shows a light source and an optical element embedded in an encapsulant layer that has a curved exit surface.
Figure 11:
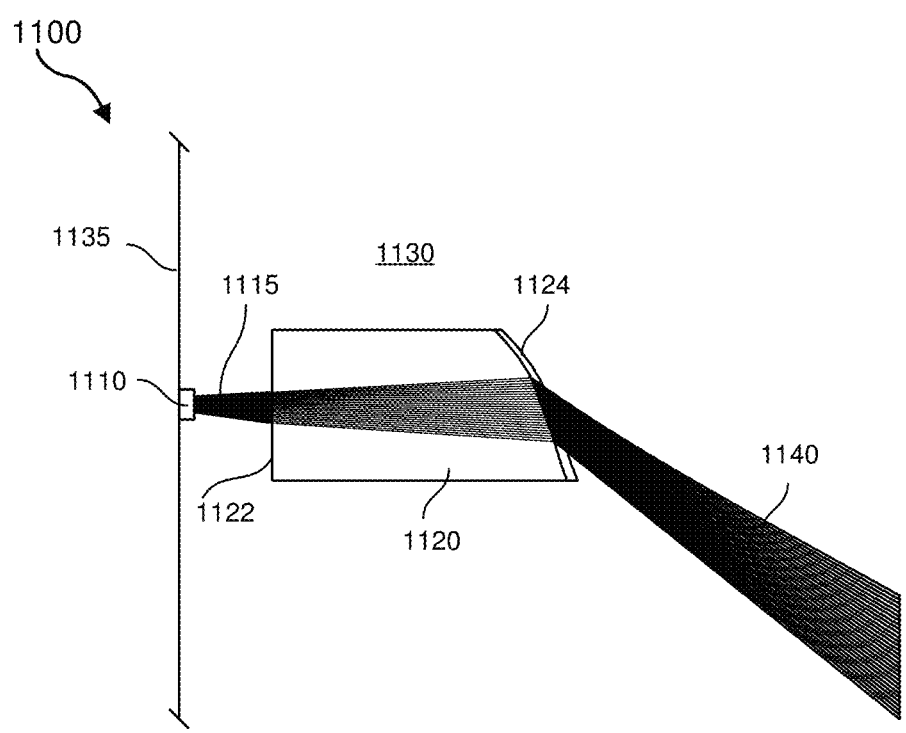
FIG. 11 further illustrates a light source and an optical element embedded in an encapsulant layer.
Figure 15:
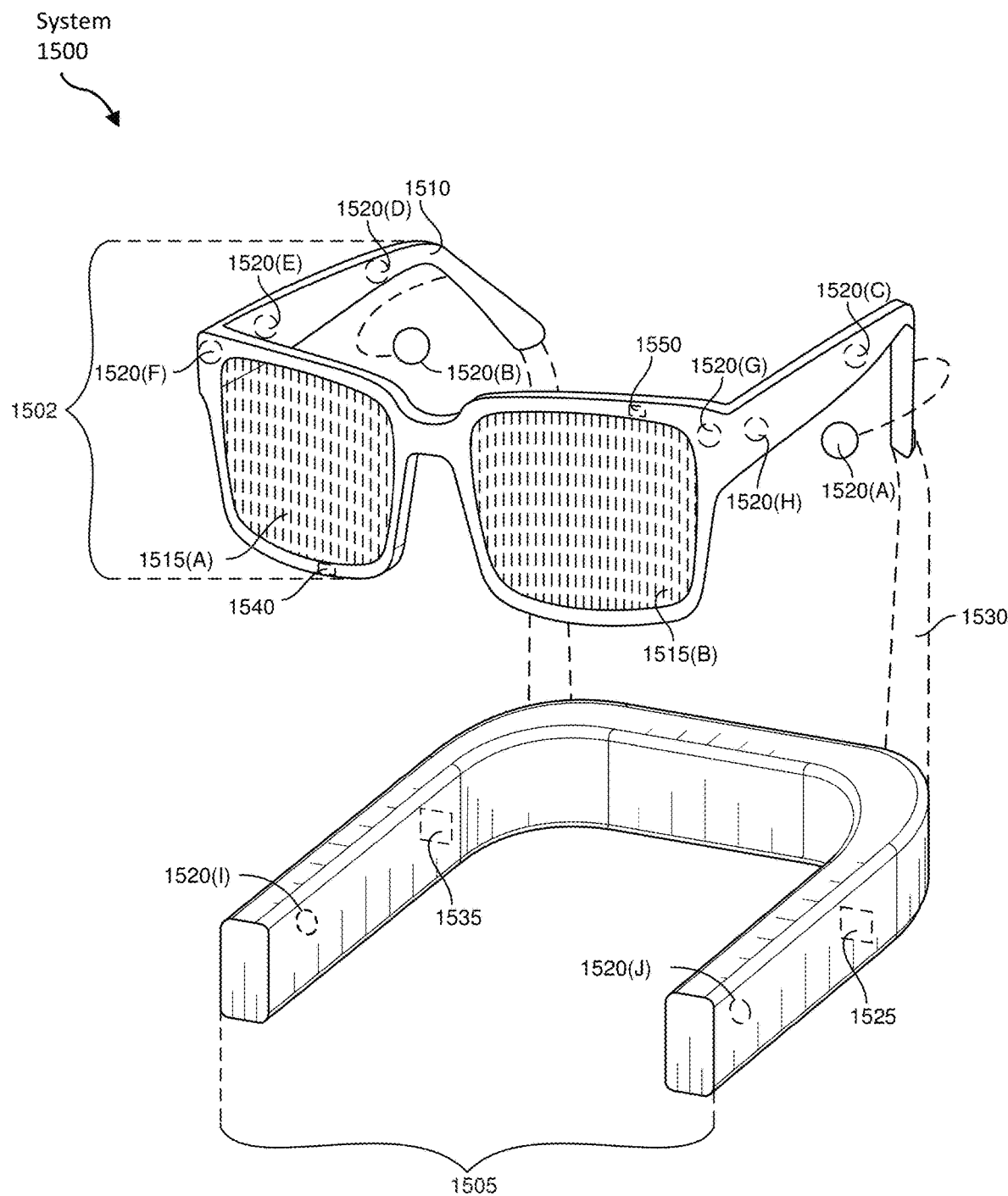
FIG. 15 is an illustration of exemplary augmented-reality glasses that may be used in connection with embodiments of this disclosure.
Figure 16:
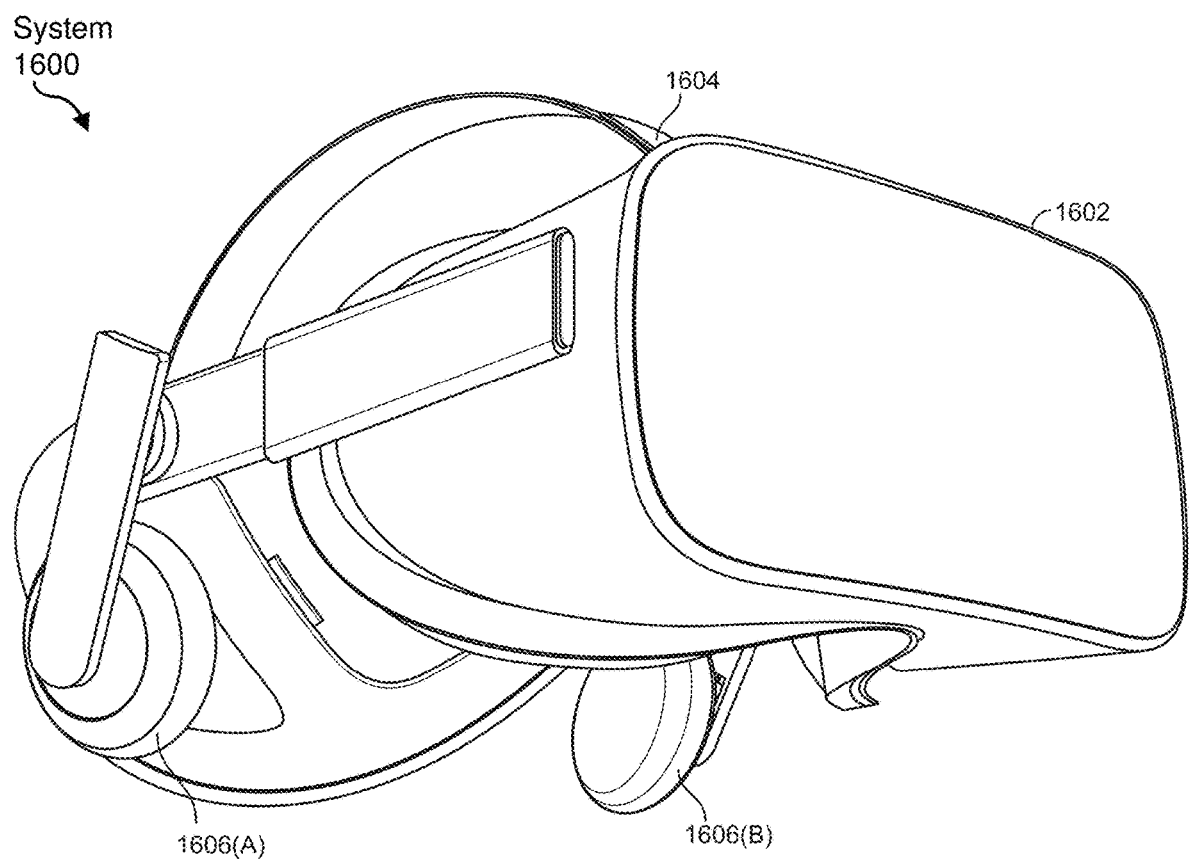
FIG. 16 is an illustration of an exemplary virtual-reality headset that may be used in connection with embodiments of this disclosure.
Figure 17:
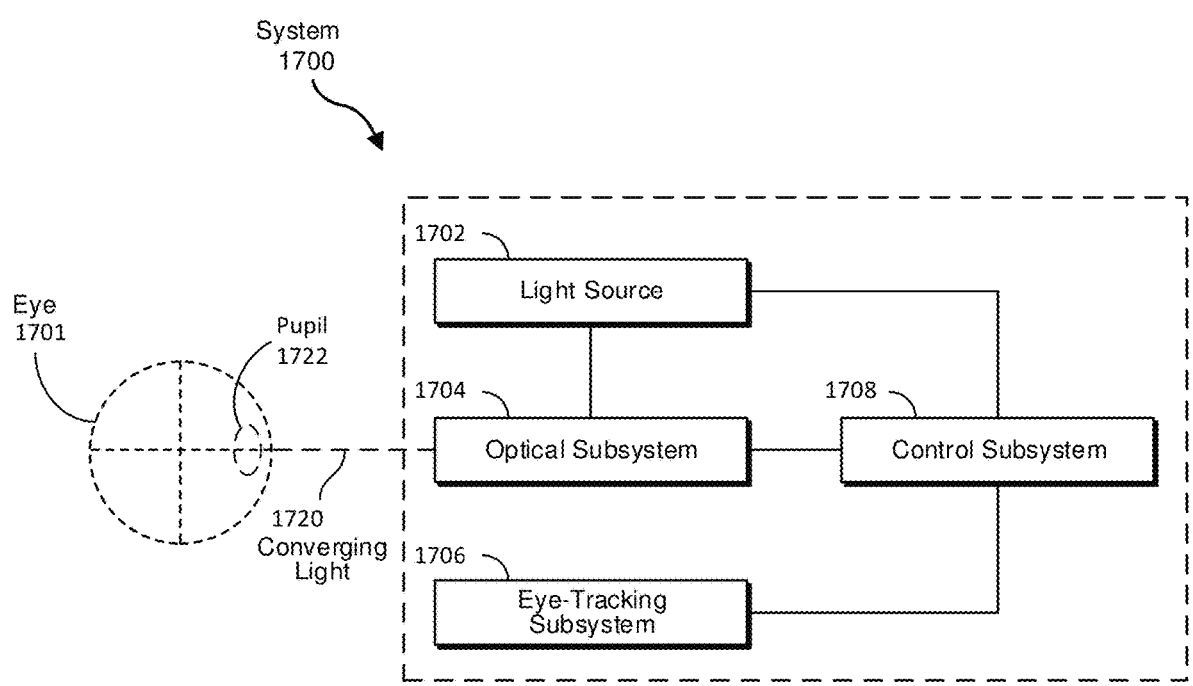
FIG. 17 an illustration of an exemplary device that incorporates an eye-tracking subsystem capable of tracking a user's eye(s).
Figure 18A:
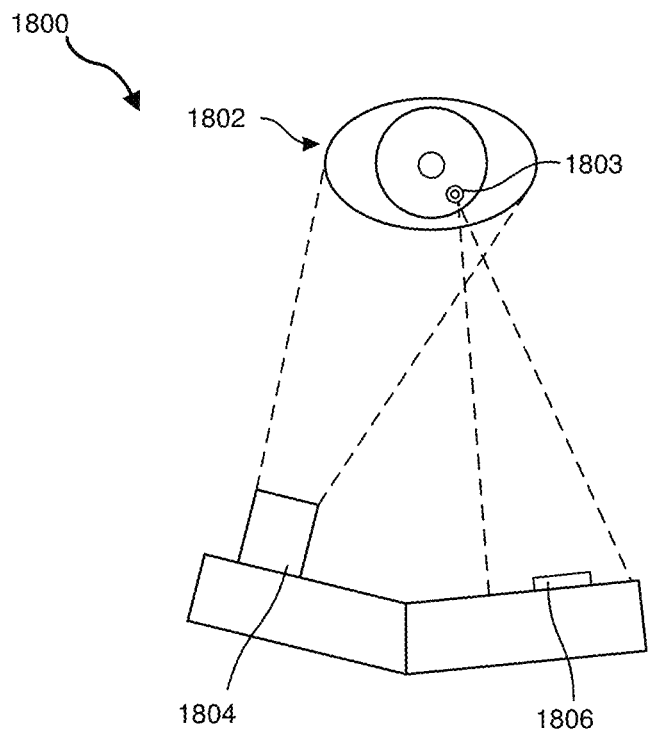
FIGS. 18A-18B further illustrate various aspects of the eye-tracking device illustrated in FIG. 17.
Figure 18B:
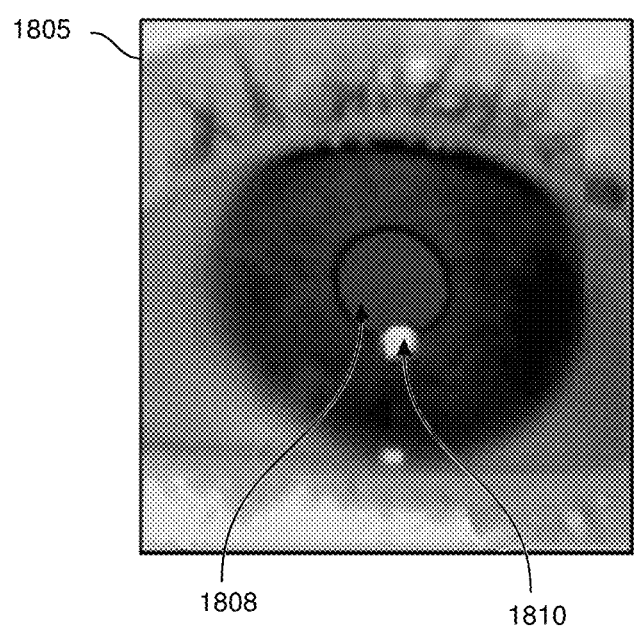

The following will provide, with reference to FIGS. 1-18B, detailed descriptions of example illumination devices. FIG. 1 is a schematic of a device including a light source, an optical element, and an encapsulant layer. FIG. 2 illustrates an optical element with a prismatic exit surface. FIG. 3 illustrates the illumination of a target from an oblique angle. FIGS. 4A-4B qualitatively illustrate the illumination uniformity of a target. FIG. 5 shows an example optical element with an aspheric curved exit surface. FIGS. 6 and 7A-7B illustrate illumination from an oblique angle, with improved illumination uniformity using an optical element with an aspheric curved exit surface. FIGS. 8-9 illustrate possible locations of light source and optical element combinations at locations of predetermined radial separation from the optical center of the lens. FIGS. 10-11 show example light sources and optical element embedded in an encapsulant layer. FIGS. 12A-12E, 13A-13E, and 14A-14B illustrate freeform curved surface coefficients of optical element exit surfaces, along with radial locations of the light source/optical element combinations, and illustrative representations of illumination uniformity. FIGS. 15 and 16 illustrate exemplary augmented-reality glasses and virtual-reality headsets that may be used in connection with embodiments of this disclosure. FIGS. 17 and 18A-18B illustrate an exemplary device that includes eye-tracking.

Features from any of the embodiments described herein may be used in combination with one another in accordance with the general principles described herein. These and other embodiments, features, and advantages will be more fully understood upon reading the following detailed description.

Illumination systems for eye tracking may use, for example, an array of IR sources within the eye wire of a frame of glasses or a separate illumination device that at least partially obscures a user's view. A separate illumination device has the advantage of placing the light sources closer to the relaxed viewing direction of the user. This reduces the chance that light is obscured by the user's eyelids or other facial features, but partially obscures the user's view, and may also create social factors that affect a user's interaction with others.

Efficiently steering and spreading emission from a light source that is in the field of view of a user, while being invisible to both the user and others, is difficult, requiring that the device optics be very small (e.g., less than about 500×500 microns, such as less than 200×200 microns), efficiently illuminate the eye, while not coupling a substantial amount of light that totally internally reflects in any encapsulant layer. In some examples, a high index optical element (such as a lens) embedded in an encapsulant layer eliminates the need for an air space that is often required for optics including a low index materials, such as polymers and common optical glasses. In some examples, a device may advantageously provide uniform illumination over a wide range of projected angles. The example encapsulated high-index lenses may be fabricated with complex shapes, such as complex aspheric curved exit surfaces, that increase illumination intensity as a function of angle, at least partially compensating for the effects of increased projected angles when using off-axis illumination of a target, such as the eye.

In some examples, a device may include a light source, such as a semiconductor light source, such as a semiconductor laser or a light emitting diode. The light source may be configured to produce a light beam, that may include a chief ray. The device may further include an optical element, and may further include an optical medium. In some examples, the light source and the optical element are encapsulated in the optical medium. In some examples, the term "encapsulated" may refer to being embedded, at least in part, in the encapsulant layer. The encapsulant layer may include, for example, a solid optical medium, such as an optical polymer. An optical polymer may include a polymer that is generally transparent, at least for the emission wavelength(s) of the light sources. A light beam produced by a light source may enter the optical element through an entry surface of the optical element, and exit the optical element through an exit surface of the optical element. The light beam may enter the optical element along an entry direction, and in some examples, the entry surface of the optical element may be generally planar. After exiting the optical element, the light beam may proceed along an exit direction. The light beam may be refracted by the optical element, so that the exit direction of the chief ray of the light beam after passing through the optical element is at a substantially different angle than the direction of the light beam emitted by the light source. An optical medium may include a polymer, such as an acrylic polymer (e.g., polymethylmethacrylate, PMMA, etc.), a polycarbonate, or other polymer.

In some examples, there may be one or more light sources, and associated optical elements, embedded in an encapsulant layer. In some examples, the term "illuminator" may refer to a device including a combination of a light source and an optical element. In some examples, there may be two or more light sources embedded in an optical medium, for example, two or more light sources, each with associated optical elements encapsulated within a single encapsulant layer. In some examples, devices may provide a plurality of light beams exiting the respective optical element along different directions, for example, directed towards the target from different laterally offset locations.

In some examples, the refractive index of the optical element (e.g., refractive index at the light beam wavelength) may be greater than the refractive index of the optical medium used to form the encapsulant layer. The refractive index of the optical element may be at least 0.1 higher than the refractive index of the optical medium (e.g., used to form an encapsulant layer), for example, at least 0.2 higher, in some examples at least 0.5 higher, and in some examples at least 1.0 higher. Refractive indices may be determined, for example, at an emissive wavelength of the light source, and, for example, at a typical operating temperature of the device (e.g., 70 degrees F.).

In some examples, less than 50% (e.g., less than 40%, in some examples less than 30%, in some examples less than 20%, and in some examples less than 10%) of the light emitted by the light source may be totally internally reflected by the optical medium.

In some examples, a device (e.g., an illumination device, such as an eye illumination device, such as an augmented or virtual reality device including eye illumination using one or more light sources and optical elements) may include a substrate (e.g., a transparent substrate), a semiconductor light source having at least one light emission region, and an optical element positioned proximate the light emission region, and the optical element may be configured to receive a light beam from the light source. In some examples, the semiconductor light source and the optical element may be embedded in an optical medium, such as an encapsulant layer, and the substrate may be proximate or adjacent to the optical medium. In some examples, the optical element may be embedded in the encapsulant layer. In some examples, the light source may be partially embedded in the encapsulant layer, or configured so that light from the light source is received by the optical element, either directly or through a portion of the encapsulant layer. In some examples, a device may be configured so that the combination of the light source, the optical element, and the optical medium illuminate the pupil region of a user's eye.

In some examples, a device may include a light source and an associated optical element embedded in an optical medium and a camera configured to view the user's eye. In some examples, the camera may be configured to detect a portion of the light beam reflected from the eye to the camera. This reflected light may include, for example, a corneal glint, or other reflected or scattered light. As used herein, the term "reflected light" may, in some examples, include light that is specularly reflected from the eye, or light incident on the eye that is otherwise returned to the camera.

In some examples, a holographic element may be located adjacent to or proximate at least a portion of the transparent substrate.

In some examples, light emitted by the light source may include infrared (IR) light, for example, near-IR light. The optical element and the optical medium may both be generally transparent in at least a portion of the IR spectrum, and, for example, may be generally transparent for at least the light beam wavelength. A generally transparent material may have a transmissivity of at least 90% for the respective wavelength at which the material is considered generally transparent.

In some examples, the optical element includes a semiconductor, such as a phosphide semiconductor (e.g., gallium phosphide), or an arsenide semiconductor (e.g., gallium arsenide).

In some examples, the light source includes a laser, light-emitting diode, or other light source. Example laser light sources include a semiconductor laser such as a laser diode (LD) or vertical cavity surface-emitting laser (VC-SEL). Example light-emitting diodes (LEDs) may include a resonant cavity LED (R-C LED) or a superluminescent LED (SLED).

In some examples, a device may further include a layer that transmits visible light but absorbs IR light. This layer may be proximate to a transparent substrate. For example, an IR absorbing layer may be located below the light source, for example, between the light source and a substrate.

In some example optical systems, a light source may be configured to provide a light beam including a chief ray. The chief ray may be the average ray of light emitted from the light source, such as the average direction found by averaging one or more intensity-angle relationships. The chief ray may exit the light source along a first direction. The optical element may redirect the chief ray along a second direction, for example, towards the center of a target such as an eye.

An optical system may include one or more holographic elements. A reflective or transmissive holographic element may divert the path of light within a desired range of wavelengths. Example holographic elements include volume holograms and polarization volume holograms.

In some examples, a device may be configured to determine eye shape, such as the shape of the edge of an ophthalmic lens. In some examples, this determination of the eye shape may be used to adjust the focal length of one or lenses through which light enters the eye.

FIG. 1 shows a device 100 including a light source 110 (e.g., a light source such as a light-emitting diode), that may be supported on a transparent substrate (not shown). The figure indicates a possible location of the light source. In this example, light source 110 is encapsulated, in whole or in part, in an encapsulant layer 120, and light emitted by the light source is refracted by a high index optical element 130 that is also encapsulated in encapsulant layer 120. The light may pass through the encapsulant layer 120, forming an array of rays 140 that are emitted into the environment outside of the encapsulant layer. A prismatic structure 150 may be included to further modify the beam profile, for example, to reduce hot spots.

In some examples, an encapsulant layer may include an optical medium in which the optical element is embedded. The encapsulant layer may have a curved exit surface, for example, a generally concave exit surface, from which light generated by one or more light sources exits the encapsulant layer to illuminate the eye.

FIG. 2 shows an optical system 200 having a light source 210 that passes through an optical element 220 (e.g., having a high refractive index) forming a ray bundle 250. The optical system 200 may be encapsulated in an encapsulant layer (not shown). Individual rays from the ray bundle 270, 280, and 290 show a progressively increasing ray angle. The optical element 220 may modify the chief ray angle for the bundle of rays 250 by having a prismatic surface 295. The prismatic surface 295 provides an exit surface for the optical element, through which the light beam may leave the optical element and, in some examples, enter an encapsulant layer. In some examples, the exit surface may include an interface between the optical element and the encapsulant layer. The figure shows the light beam being emitted from the light source having an initial direction along the Z-coordinate direction, but in this and other examples, the choice of coordinate system may be arbitrary.

FIG. 3 shows an optical system 300 with a light source 310, where a light beam emitted by the light source 310 is redirected by an optical element (not shown), and passes through an encapsulant layer 330 as beam 320. A ray bundle 350, emerging from the encapsulant layer, may illuminate a target 360. The target may represent an eye box of a user. The encapsulant layer may have a concave surface 340, and the optical system may form projected rays 370, 380, and 390, where a projected ray density of the three rays 370, 380, and 390 on the target 360 has reduced density with increasing angles.

FIG. 4A shows the illumination intensity generally at 400, for example, for light illuminating the target 360 in FIG. 3. The Y-axis and X-axis of the graph represent the vertical and horizontal directions, respectively. This figure shows that the device described above in relation to FIG. 3 provides reasonably uniform illumination over the target region 360. In some examples, uniformity along an orthogonal direction (that may be denoted z) may also be improved.

FIG. 4B further illustrates illumination uniformity, in terms of irradiance level along a spatial axis. The figure illustrates (qualitatively) the relative illumination intensity along the Y-axis.

FIG. 5 shows an optical system 500 with a light source 510 and an optical element 520, both of which are encapsulated in an encapsulant layer (not shown). The optical element 520 may have an aspheric surface 530, through which the light beam leaves the optical element, that both changes the chief ray angle for light emitted by light source 510 and modifies the relative ray angles for rays 570, 580, and 590. This curved surface configuration allows improved uniformity of illumination from oblique angles, for example, when the light source is offset laterally relative to the center of the illumination target region (e.g., having a radial offset from the center of the eye). The curved output surface of the optical element may be a freeform surface, and may lack rotational symmetry (e.g., around the optic axis and/or chief ray of input or output light beams). In some examples, the exit surface may be an anamorphic aspheric surface. In some examples, the exit surface may include a curved interface between the optical element and an encapsulant layer.

FIG. 6 is a schematic diagram illustrating the illumination (shown generally at 600) provided by an optical system, such as an optical system similar to the optical system 500 shown in FIG. 5. The optical system includes a light source at 610 providing light 620, and an encapsulant layer 630 having a curved (e.g., concave) surface 640. The figure shows that the projected ray angles (within ray bundle 650) are at least partially compensated for by the increased projection angle of rays within the ray bundle 650 illuminating a target 660. In this example, rays 670, 680, and 690 have similar spacing illuminating target 660, despite the increasing projected angle.

FIG. 7A shows the improved illumination uniformity, generally at 700, of a target (e.g., the target 660) illustrated by an optical system such as that discussed above in relation to FIG. 6.

FIG. 7B further illustrates illumination uniformity. The figure illustrates (qualitatively) the relative illumination intensity along the Y-axis.

FIG. 8 shows an eye-tracking device 800 having a substrate 810 (that may have the shape and dimensions of an eyeglass lens, and may be a transparent substrate), having an arrangement of pairs of light sources and optical elements (e.g., high refractive index microscale optical elements), such as 820, 830, and 840. The locations of the combinations of light sources and associated optical elements may be distributed over the substrate 810 in a pre-determined arrangement relative to the shape of the transparent substrate. The concentric circles illustrate radial distances of 18 mm, 36 mm, and 50 mm, that may be, for example, approximate radial distances from the optical center of a lens, and/or from the optical center of the eye of a user. Example locations of the combinations of light sources and optical elements are shown at 820, 830, and 840, and other locations may also be used, for example, arranged around predetermined radial distances. A frame, such as a portion of an eyeglass frame, may extend around the substrate, and may be configured to support the device on the head of a user.

FIG. 9 shows a schematic of a cross-section of a device showing the illumination from an eye-tracking device 900 on a target 940 that may represent a user's eye. The eye-tracking device may be, for example, similar to the device discussed above in relation to FIG. 8. The figure shows combinations of light sources and optical elements (e.g., at 910) within encapsulant layer 920, providing light beams such as 930 and 935. The encapsulant layer, and the light sources, are supported on a substrate 960. In some examples, the substrate may be a transparent substrate, and may provide a lens or window of a device, such as a device also including a near-eye display. The substrate, encapsulant layer, and other components, such as those described above, may be supported in a frame 970. In some examples, light sources and/or an encapsulant layer may be supported by the frame, and the substrate may be omitted. Different patterned lines are used to show illumination patterns of different light sources. In this example, the encapsulant surface 950 facing the eye has a generally concave shape. The substrate may be transparent for augmented reality applications, and may be provided by a window or a lens supported by a frame in an eyeglass-based device. In some examples, a substrate may not be transparent, for example, as part of a virtual reality device. In some examples, the frame 970 may extend around the periphery of the lens, and may be part of an eyeglass shape. The shape of the frame may be similar to that of the periphery of the shape shown in FIG. 8. In this example, the substrate is shown having two planar surfaces, but in some examples, at least one surface may be curved. In some examples, the substrate may be a transparent substrate. The substrate may be configured to allow one or more of the following to pass through the device and reach the eye of a user; light from the ambient environment (the "real world"), augmented reality image light, and/or virtual reality image light.

A light beam generated by a light source may have an initial direction, that may, for example, be generally normal to a proximate substrate surface, and/or normal to the entrance surface of the optical element. The beam direction may be considered as the mean or average beam direction, though an example light source may provide a light beam within an emission cone.

FIG. 10 shows a portion of a further example of an illumination system 1000, including light source 1010, optical element 1020, and encapsulant layer 1030. The combination of light source 1010 and optical element 1020 produce light ray bundle 1040, which is refracted at the encapsulant surface 1050, to provide eye-illuminating ray bundle 1060. In some examples, the encapsulant surface 1050 may have a generally concave profile. The figure also shows a transparent substrate 1070, that may support the light source, and may be adjacent the encapsulant layer.

FIG. 11 shows an example encapsulated light source and optical element. The figure shows a portion of an eye-tracking device at 1100. The device 1100 includes a light source 1110, configured to emit a light beam 1115 that is received by an optical element 1120. The light beam is received by the light receiving surface 1122 of the optical element 1120, and refracted by a freeform curved surface 1124 into the encapsulant layer 1030 as a beam 1140. Only a portion of the encapsulant layer 1130, and a surface of the encapsulant layer 1135, are shown in this figure. The light beam 1140 may be further refracted at a second surface of the encapsulant layer (not shown), and form an eye illuminating beam. The freeform curved surface may have a form described by Equation 1, and may be described by coefficients such as the example coefficients described herein.

In some examples, an eye-tracking device may include a light source, such as a laser, such as a semiconductor layer, such as a surface-emitting semiconductor laser, such as a vertical cavity surface emitting laser (VCSEL). Example light sources may have a surface emitting cone of between 10 and 50 degrees, such as between 10 and 40 degrees. Example light sources may have an emission area having one or more dimensions (such as one or more emission area side lengths) of between approximately 5 microns and approximately 10 microns.

In some examples, an optical element may be a lens having a freeform curved surface. The freeform surface may be represented by Equation 1, as follows:

$$z = \frac{cr^2}{1 + \sqrt{1 - (1+k)c^2 r^2}} + \sum_{i=1}^{N} A_i E_i(x, y). \quad \text{(Equation 1)}$$

In Equation 1 above, z represents the surface coordinate (e.g., relative to a value representative of a planar surface, for example, relative to a plane at z=0, and this term may also be referred to as the sag), c is a constant (in some examples, c may be referred to as the curvature), r is a radial distance from the optic axis (e.g., a radial distance from a center of the lens), and k is a constant (e.g., sometimes referred to as a conic constant). For the second term (on the right of the equality symbol), N may represent the order of the numerical representation (discussed further below), and $A_i$ and $E_i$ may represent coefficients, such as additional coefficients describing the surface form in powers of x and/or y. In some examples, the surface coordinate z, along a particular direction, may be a function of a radial distance (r) from the optic axis, and the second term in Equation 1 may be replaced by aspheric coefficients associated with powers of the radial distance, for example, aspheric coefficients of the form $A_i r^i$, where i may have one or more values, such as 1, 2, 3, 4, 5, 6, etc., A may be termed an aspheric parameter, and r is a radial distance. However, the aspheric coefficients may also vary with a function of the direction along which the radial distance is measured. In some examples, an aspheric surface may have rotational symmetry about the optic axis. However, in some examples, an optical element may have an aspheric surface that lacks such rotational symmetry, that may be termed a freeform surface. A freeform surface may lack any rotational symmetry about the optic axis, and may lack any symmetry. In some examples, a freeform surface may be described by one or more coefficients (that may be termed freeform coefficients) related to powers of a distance (e.g., along a particular direction, such as along orthogonal x or y directions) that may be different along the different directions. For example, a freeform surface may be represented by an equation having the form of Equation 1, and the coefficients $A_i$ and $E_i$ may be termed freeform coefficients. A freeform surface may have coefficients representing surface variations along the x direction (e.g., associated with different powers of distance along the x direction), along the y direction (e.g., associated with different powers of distance along the y direction), and may include coefficients that may be termed cross-terms, having both x and y dependencies (e.g., coefficients of terms in xy, $xy^2$, etc.). In some examples, a surface of an optical element may be spherical or aspheric along a particular direction, and spherical or aspheric (e.g., with a different radius of curvature and/or different aspheric coefficients) along another direction (such as along an orthogonal direction). In some examples, a device includes an optical element including an aspheric surface, such as a freeform surface, having at least one non-zero (e.g., appreciable) value of one or more aspheric or freeform coefficients, for example, along one or more directions orthogonal to the optic axis. In some examples, a surface may be a freeform surface, having numerical freeform coefficients associated with the dependency of the surface coordinate (e.g., z of Equation 1) on one or more powers of a distance from a reference point, for example, powers of distance measured along orthogonal x and y directions. In some examples, a freeform surface may be considered to be a type of aspheric surface, for example, an aspheric surface lacking symmetry. A freeform surface may lack any rotational symmetry around the optic axis, unlike a spherical surface.

In some examples, the freeform surface may be configured so that the efficiency of the eyebox illumination is at least 80%, and in some examples, at least 90%. In some examples, the illumination is generally uniform, for example, uniform within one standard deviation.

FIGS. 12A-12E illustrate an example configurations of an optical element, in this example a lens having a freeform curved surface (e.g., as discussed above, e.g., in relation to FIG. 11).

FIG. 12A is a table showing numerical coefficients of the freeform surface, for an optical element having a freeform curved surface. The optical element was configured for use with a light source located on the 25 mm radius circle. The radius circles are further discussed elsewhere, for example, above in relation to FIGS. 8 and 9. The terms X and Y may represent distances along orthogonal directions, and the number may represent a power (e.g., X2 may represent X squared). The coefficients relate the surface curvature (e.g., of a freeform surface of the optical element) to the terms, for example, as discussed above in relation to Equation 1. In some examples, coefficients may be modified according to the application, and/or the dimensions of the optical system.

FIG. 12B shows a partial configuration of an eye tracker device including a light source and an example optical element having a freeform surface configured according to the numerical coefficients shown in FIG. 12A. The device 1200 includes a combination of a light source and an optical element at 1210, and an encapsulant layer 1230 having a curved surface 1240. The light source is configured to generate a light beam that passes through the encapsulant layer 1230 and is refracted at the curved surface 1240 to provide the eye-illuminating ray bundle 1250. In this example, the light source is located on the 25 mm radius circle.

FIG. 12C shows a qualitative illustration of illumination uniformity. In this example, the uniformity was acceptable, and the efficiency was approximately 78%.

Figures 12D, 12E, 13A:
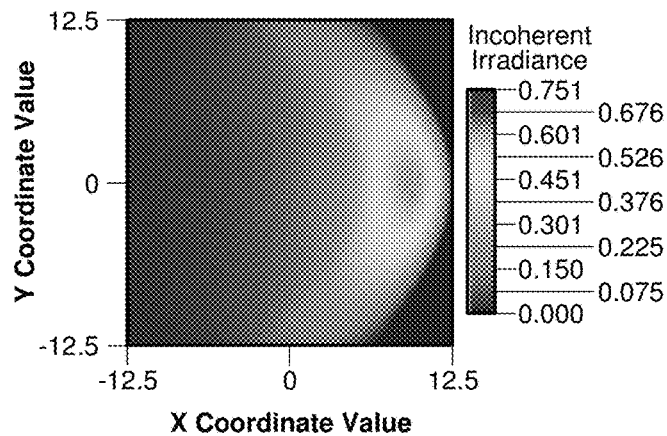

FIG. 12D shows is a table showing numerical coefficients of the freeform surface, for an optical element having a freeform curved surface. In some examples, a freeform curved surface may be referred to as a freeform surface, for conciseness. In this example, the numerical coefficients for the freeform surface include fourth order terms.

FIG. 12E shows a qualitative illustration of illumination uniformity. In this example, the uniformity was acceptable (with a variation of approximately 0.43 standard deviations), and the efficiency was approximately 81%. Hence, including fourth order terms in the curvature of the freeform surface of the optical element advantageously improved the efficiency to over 80%. In this example, the optical element was used in a configuration similar to that shown in FIG. 12B.

FIG. 13A is a table showing numerical coefficients of the freeform surface coefficients for an optical element having a freeform curved surface. In this example, the optical element was configured for use with a light source located on the 9 mm radius circle.

Figure 13B:
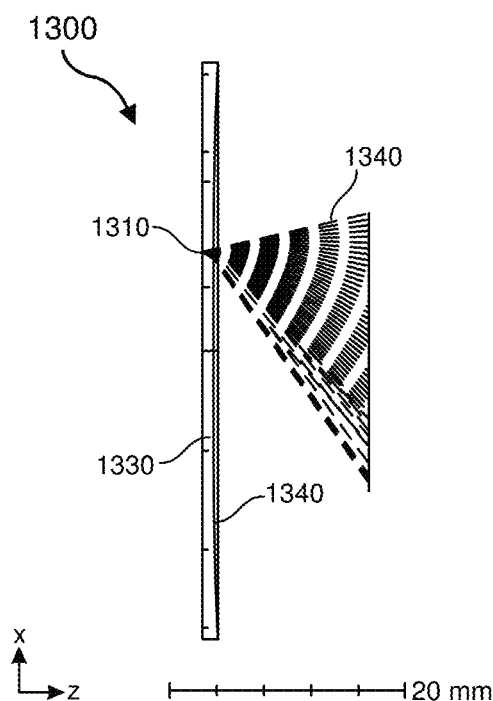

FIG. 13B shows a partial configuration of an eye-tracking device including a light source and an example optical element having a freeform surface configured according to the numerical coefficients shown in FIG. 13A. In this example, the light source is located on the 9 mm radius circle (as discussed, for example, in relation to FIGS. 8 and 9). The device 1300 includes a combination of a light source and an optical element at 1310, and an encapsulant layer 1330 having a curved surface 1340. The light source is configured to generate a light beam that passes through the encapsulant layer 1330 and is refracted at the curved surface 1340 to provide the eye-illuminating ray bundle 1350.

Figure 13C:
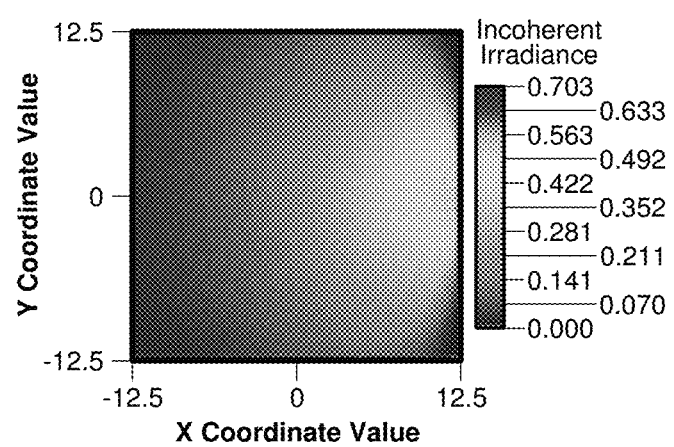

FIG. 13C shows a qualitative illustration of illumination uniformity. In this example, the uniformity was acceptable, and the efficiency was approximately 88.5%.

Figures 13D, 13E:
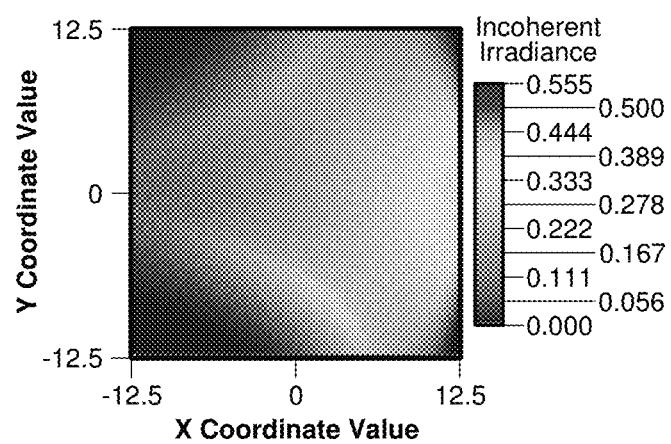

FIG. 13D is a table showing numerical coefficients of the freeform surface, for an optical element having a freeform curved surface. The optical configuration was similar to that shown for FIGS. 12B and 13B, with the optical element and light source combination located on the 18 mm radius circle.

FIG. 13E shows a qualitative illustration of illumination uniformity. In this example, the uniformity was acceptable, the efficiency was approximately 83.1%, and the uniformity was excellent at 0.38 standard deviations. In this example, the combination of a plurality of light source, each light source having an associated optical element embedded in an encapsulant layer, provides generally uniform illumination of a target (e.g., an eye). Length scales, such as the length scale shown in this figure, are exemplary and non-limiting.

Figures 14A, 14B:
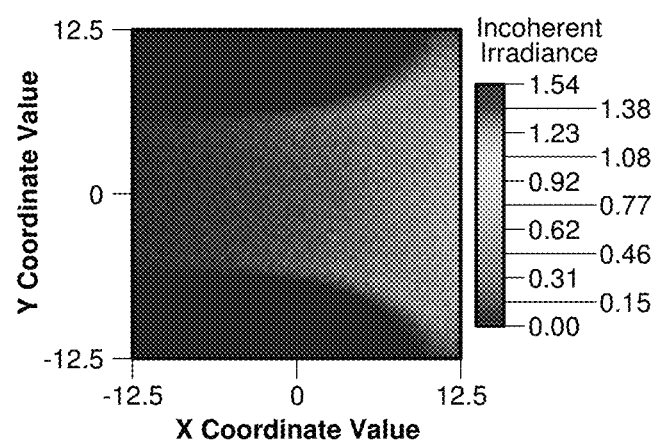
FIGS. 14A-14B further illustrate freeform curved surface coefficients.

FIG. 14A is a table showing numerical coefficients of the freeform surface, for an optical element having a freeform curved surface. The optical configuration was similar to that shown for FIGS. 12B and 13B, with the optical element and light source combination located on the 18 mm radius circle (as for FIG. 13D, above).

FIG. 14B shows a qualitative illustration of illumination uniformity. In this example, the uniformity was acceptable, and the efficiency was approximately 76%. The performance was reasonable, but the efficiency was slightly less than using the coefficients of FIG. 13D.

In some examples, a method according to the concepts described herein includes generating a light beam using a light source, receiving the light beam by an optical element, receiving the light beam using an encapsulant layer, and illuminating a target using the light beam. The light beam may be redirected at an exit surface of the optical element. The exit surface may be a planar surface oblique to the initial direction of the light beam, or may be a curved surface, such as an aspheric curved surface. The target may be an eye, and the target may be illuminated using the light beam received from the encapsulant layer. The eye may be illuminated by a plurality of light beams, with each light beam being generated by a respective light source of a plurality of light sources that include the light source. Light reflected from the eye may be detected and used to determine one or more parameters related to the eye, such as focus, exterior corneal profile, gaze direction, pupil diameter, and the like. In some examples, the method may be performed by an augmented reality device or a virtual reality device.

In some examples, an optical element may be a high refractive index optical element configured for beam shaping and/or beam steering of light beams, such within an eye-tracking device. In some examples, an optical element may be fabricated directly on the emitting surface of a light source. An optical element may include, for example, a micro-lens, prism, and/or a diffractive element. In some examples, an optical element may include a light receiving surface, that may be planar. The light receiving surface may receive light from a light source, and may also be referred to as an entrance surface as light from the light source enters the optical element through the entrance surface. The optical element may also include a curved surface through which light leaves the optical element. This may be referred to as an eye-side surface or exit surface, as it may face the eye of a user of the device in normal operation, and is the surface through which light may exit. The freeform surface may be configured to provide acceptable illumination uniformity of the eyebox (e.g., that may be the region of the eye illuminated for eye tracking applications). In some examples, the illumination uniformity may be less than 1 standard deviation. In some examples, the illumination uniformity may be less than 0.5 standard deviations.

In some examples, the light source may include, for example, a light-emitting diode, or a laser (e.g., a semiconductor laser, such as a vertical cavity surface emitting laser, or VCSEL).

Example high refractive index materials include semiconductors, such as arsenide semiconductors (e.g., GaAs, AlAs, AlGaAs), phosphide semiconductors (e.g., GaP, InGaP), nitride semiconductors (e.g., InN, GaN, AlN), other III-V or II-VI semiconductors, or inorganic dielectric materials such as oxides (e.g., titanium dioxide). In some examples, the refractive index of the high-index material may be greater than 2 or 3, at the light source emission wavelength, and a semiconductor bandgap may be greater than the photon energy.

In some examples, an optical element may be fabricated directly on the light source, for example, using semiconductor processing techniques. In some examples, an optical element may be fabricated on a separate substrate and placed on the light source, for example, bonded with or without an adhesive. In some examples, light sources and optical elements may be fabricated on separate wafers, and the wafers then aligned and bonded. In some applications, the light sources may be part of augmented or virtual reality headware, for example, LEDs embedded in the lenses of augmented reality glasses. The optical elements may be used to direct a light beam towards the center of the eyebox, for example, with an improved beam shape, improved illumination properties such as illumination uniformity, improved glint capture, and/or improved algorithmic pupil edge detection. An optical element may have a complex surface shape, such as a freeform surface. In some examples, the optical element may have an optical coating, for example, to modify reflection or diffraction properties.

In some examples, one or more of the facets of the optical element (e.g., the entrance surface and/or the exit surface) may have a surface structure that can have controlled amounts of periodic or aperiodic perturbations, whose periodicity is much larger than the scale of the wavelength of light like micro-lens arrays. In some examples, one or more of the facets of the optical element may have a dielectric or metallic coating, for example, to reflect light towards another facet through which the light exits the optical element. In some examples, one or more of the facets of the optical element may have an anti-reflective coating, for example, to reduce reflection at a particular facet, or may have a coating including other emissive elements (e.g., coatings including quantum dots, phosphors, fluorophors, non-linear optical materials, lasing materials, or other photoluminescent materials). In some examples, a coating may change the color of light emission. Antireflective coatings may have low reflectivity for the range of the source wavelengths, or for visible light, or for both. A coating may also include scattering elements (e.g., microparticles, nanoparticle, or other particles). In some examples, one or more of the facets of the optical element may reflect light due to, for example, total internal reflection based on the angle of incidence of the beam, or due to a reflective coating such as a metal film.

In some examples, the sides of the optical element may have a surface structure with periodic or aperiodic perturbations to reduce visible glints. The surface structure may be created either during fabrication, for example, as a result of patterned etching, or in a post-fabrication etching or deposition process.

In some examples, the optical element may be fabricated directly on a wafer supporting the light source (that may be termed an emitter wafer), for example, using one or more semiconductor processes, such as chemical vapor deposition (CVD), physical vapor deposition (PVD), lithography, or etching (e.g., dry or wet etching). In some examples, a combination of the light source and the optical element may be fabricated as a unitary device. An optical medium may then be deposited to encapsulate the optical element in an encapsulant layer, or the optical medium may be deposited at a later stage.

In some examples, the optical element may be fabricated on a different substrate (e.g., a semiconductor or glass carrier wafer) from the emitter wafer used to fabricate the light source. The optical element may be fabricated using one or more process such as spatially modulated UV, optical, or e-beam lithographic exposure, with masks, using direct laser writing, etching (e.g., dry or wet etching), or another lithography process. In some examples, the size of a wafer may be less than 1 inch in diameter. An optical medium may also be deposited, for example, to form an optical interface with the exit surface of the optical element.

In some examples, an optical medium may have multi-layer structure, for example, a first layer formed around an optical element (e.g., in the process used to form the optical element) and a second layer, optionally of the same material, added at a later stage.

An optical element, substrate (including, e.g., a wafer), and/or a light source may include a semiconductor material. The semiconductor material (e.g., used for the optical element) may be an arsenide semiconductor (e.g., GaAs), a phosphide semiconductor (e.g., GaP), or other III-V semiconductor, or a II-VI semiconductor (e.g., a selenide, sulfide, or other chalcogenide material). The optical elements on the semiconductor wafer, and any surrounding optical medium (if any), can be diced using a laser dicer, dicing saw, or similar process, into individual units. The individual units can be deposited and positioned on top of the surface of an individual light source using a pick and place process. The individual units can be bonded to the light source surface using an organic adhesive, such as epoxy or UV curable resin. In some examples, the individual units can be bonded to the light source surface without adhesives, using an approach such as direct wafer bonding, surface activated bonding, or plasma activated bonding.

In some examples, the optical elements may be patterned on an optical element wafer with the same spacing and periodicity as the light sources on the emitter wafer. The optical element wafer may be picked and placed and positioned to some tolerance based on design on top of the emitter wafer, for example, through the use of fiducials. The optical element wafer may then be bonded to the emitter wafer, for example, using organic adhesives such as an epoxy or a UV curable resin. In some examples, the optical element wafer may be bonded to the emitter wafer without adhesives, for example, using an approach such as direct wafer bonding, surface activated bonding, or plasma activated bonding. After bonding the wafers together, the individual light source/optical element combination units may be diced, for example, using a laser dicer or dicing saw. In some examples, a sacrificial layer may be deposited on top of the emitter wafer, and may be planarized, for example, with a process such as chemical-mechanical polishing. An optical medium may be deposited during one or more of such process aspects, for example, before and/or after dicing (if dicing is used).

In some examples, the optical element may include a semiconductor material, such as a semiconductor layer or other semiconductor element, grown directly on the top surface of the emitter wafer. A semiconductor material may be deposited by any appropriate process, for example, by CVD, PVD, or other deposition technique.

In some examples, an optical element may be fabricated from a semiconductor layer using one or more semiconductor fabrication processes, such as lithography or etching (e.g., dry or wet etching).

Examples include devices, systems, and processes related to optical elements. In some examples, a device includes a light source, such as LED or laser. The light source may have a cross-section that is smaller than 300×300×300 micron in size. Examples include a light source and an additional optical element, such as a beam-shaping optical element, in which the optical element has an exit surface that has an interface with an optical medium.

In some examples, a light source may be fabricated on an emitter wafer. The emitter wafer may include the substrate layer on which the light source is fabricated, and may include a semiconductor such as GaN, GaAs, N—GaAs or something similar. The term emitter wafer may be used to describe the light source while it is still on the wafer, after fabrication. An emitter wafer may also include one or more of the following: a passivation features (e.g., $SiO_2$), one or more metallic bond pads (e.g., Au, Ag), quantum wells, distributed Bragg gratings, dielectric coatings, and or a backplane. A backplane or other layer may include one or more of a glass, a semiconductor such as silicon, or a metal.

In some examples, an optical element is used to modify light emission from a light source, such as an LED or a laser. The optical medium may also have aspects that provide further beam shaping, such as an exit surface, that may be planar or may include a surface structure, coating, and the like. For example, an exit surface of the optical medium may have an antireflection or other optical coating, a periodic or aperiodic surface structure, and the like. The exit surface of the optical medium may be planar, concave, convex, otherwise curved, freeform, or have one or more other aspects. The optical element and/or the optical medium may have internal refractive index gradients. An optical element may include a structured or unstructured material that is used to interact with light. An optical element may include, but is not limited to, refractive optics, reflective optics, dispersive optics, polarization optics, diffractive optics, and gradient index materials.

In some examples, the optical element may be embedded in an optical medium, in part or in whole. In some examples, both the light source and the optical element are embedded in an optical medium. The optical medium may include a block of polymer, and may be generally transparent at the wavelength of the light beam. In some examples, the optical element may include an optical polymer, that may be generally transparent over some or all of the visible wavelengths. In some examples, components such as the optical element may be transparent to IR wavelengths, such as near-IR wavelengths, corresponding the wavelength(s) of one or more light beams.

The optical medium may be used to hold the light source and optical element in optical registration with each other, for example, so that a light beam emitted from the light source takes a desired path through the optical element and exits the optical element through the exit surface. An optical element may have one or more features, such as recesses, in which the optical element and (optionally) the light source may be located. In some examples, the encapsulant layer (e.g., including an optical medium) may be formed around one or more optical elements after fabrication and positioning of the optical elements. In some examples, a device may include a light source and an optical element, that may be combined into a unitary device. In some examples, the light source and optical element may be separate components, and held in position relative to each other by an encapsulant layer or other optical medium.

In some examples, the encapsulant layer and/or a substrate may form some or all of a lens in headwear configured to be worn by a user, for example, lenses of glasses (including spectacles, a visor (e.g., a helmet visor), or the like. The encapsulant layer, and/or the substrate, may provide, at least in part, a window through which light from the local environment may reach one or both eyes of a user.

In some examples, the optical element may be fabricated directly onto the light source, for example, using on or more semiconductor fabrication processes. In some examples, the light surface may have an emission surface that may be in contact with, adjacent, substantially adjacent, or proximate the entrance surface of the optical element.

In some examples, an optical element and/or an encapsulant layer (that may also be referred to as an optical medium) may be configured to modify at least one property of a light beam, such as one or more of a beam direction, beam profile, illumination uniformity, or beam divergence (or convergence, as appropriate). In some examples, one or more of such beam properties may be modified as desired.

In some examples, an optical element may combine the functions of a prism and a lens, for example, by deviating the light beam by a beam deviation angle, and by modifying the beam profile using a curved exit surface. In some examples, the beam deviation angle may be configured so that the beam is redirected towards the center of the user's eye, and uniformly illuminates a region around the center of the user's eye.

In some examples, a method of illuminating an object, such as an eye, includes providing a light beam by a light source, with the light beam exiting the light source along a first direction, receiving the light beam by an optical element, and directing, by the optical element, the light beam along a second direction towards the object. The second direction may be at an appreciable angle to the first direction, for example, at a beam redirection angle of between 5 and 70 degrees. The optical element may have an exit surface conformed to improve the illumination uniformity of the object. The light beam may exit the optical element (through an exit surface of the optical element) into an optical medium. The light beam may be refracted or otherwise redirected at an interface between the optical element and the optical medium. The light beam may further exit the optical medium through an exit surface of the optical medium. The light beam may be further refracted or otherwise redirected at the interface between the optical medium and another medium, that may include air or another optical component.

In some examples, a device includes a light source configured to emit a light beam, an optical element configured to receive the light beam along a first direction and redirect the light beam along a second direction, and an optical medium, where the light beam exits the optical element into the optical medium. The optical element may include a high-index material. In some examples, the optical element may have a freeform surface lacking rotational symmetry. In some examples, the optical element may have a freeform surface through which light exits the optical element, for example, towards a target to be eliminated. In some examples, the optical element may include an anamorphic lens. The light source may include a light emitting diode, or a laser. In some examples, a light source may continuously illuminate the target (e.g., an eye), as long as the device is in use. In some examples, the target may be illuminated at intervals. In some examples, the target may be illuminated for illumination periods of between 1 millisecond (ms) and 0.5 seconds, at intervals between 1 ms and 1 second. In some examples, the periods of illumination may include continuous illumination, and in some examples, the periods of illumination may correspond to pulsed operation of the light source.

In some examples, the high-index material may have a refractive index of greater than 2 at a wavelength of the light beam (e.g., at a center wavelength of an emissive band). In some examples, a light beam may include visible and/or near-IR wavelengths. In some examples, the high-index material may include a semiconductor material, such as one or more of an arsenide semiconductor, a phosphide semiconductor, or a nitride semiconductor. In some examples, the high-index material may include a dielectric material, such as one or more of an oxide, a nitride, or a phosphide. The refractive index of the high-index material may be greater than the refractive index of the optical medium at the light beam wavelength. In some examples, the optical medium has a refractive index of between 1.3 and 2. In some examples, the optical medium includes a polymer. Examples may include an augmented reality system and/or a virtual reality system including one or more such devices.

EXAMPLE EMBODIMENTS

Example 1. A device may include: a light source configured to emit a light beam, an optical element configured to receive the light beam along a first direction and redirect the light beam along a second direction; and an encapsulant layer, where the light beam exits the optical element through an exit surface of the optical element into the encapsulant layer, the optical element includes a high-index material, and the high-index material has a refractive index of at least approximately 1.5 at a wavelength of the light beam.

Example 2. The device of example 1, where the light source includes a light emitting diode.

Example 3. The device of any of examples 1 and 2, where the light source includes a laser.

Example 4. The device of any of examples 1-3, where the optical element is embedded in the encapsulant layer.

Example 5. The device of any of examples 1-4, wherein the exit surface of the optical element has a curved freeform surface having no rotational symmetry.

Example 6. The device of any of examples 1-5, where the exit surface of the optical element has an aspheric curvature.

Example 7. The device of any of example 6, where the aspheric curvature of the exit surface is configured to reduce an illumination uniformity of a target to below 1 standard deviation.

Example 8. The device of any of examples 1-7, where the high-index material includes at least one of a semiconductor or a dielectric material.

Example 9. The device of any of examples 1-8, where the high-index material includes at least one of an arsenide semiconductor, a phosphide semiconductor, or a nitride semiconductor.

Example 10. The device of any of examples 1-9, where the high-index material includes an oxide.

Example 11. The device of any of examples 1-10, where: the high-index material has a refractive index of greater than approximately 2 at the wavelength of the light beam, and the encapsulant layer has an encapsulant refractive index of between approximately 1.3 and approximately 1.8 at the wavelength of the light beam.

Example 12. The device of any of examples 1-11, where the encapsulant layer includes an optical polymer.

Example 13. The device of any of examples 1-12, where the encapsulant layer includes an approximately concave exit surface through which the light beam leaves the encapsulant layer.

Example 14. The device of any of examples 1-13, where the device is at least one of an augmented reality device or a virtual reality device, and the device is configured so that the light beam is positioned to illuminate an eye of an intended user of a device.

Example 15. The device of any of examples 1-14, where the device includes a plurality of light sources, including the light source, configured to illuminate the eye of the intended user, and each light source has an associated optical element embedded within the encapsulant layer.

Example 16. A method, including: generating a light beam using a light source; receiving, by an optical element, the light beam; receiving, by an encapsulant layer, the light beam from the optical element, the light beam being refracted by an aspheric curved surface of the optical element; and illuminating a target using the light beam received from the encapsulant layer.

Example 17. The method of example 16, where the target includes an eye.

Example 18. The method of any of examples 16 and 17, where the target is illuminated by a plurality of light beams, each light beam being generated by a respective light source of a plurality of light sources, the plurality of light sources including the light source.

Example 19. The method of any of examples 16-18, further including detecting a reflected light beam from the target.

Example 20. The method of any of examples 16-19, where the method is performed by an augmented reality device or a virtual reality device.

Embodiments of the present disclosure may include or be implemented in conjunction with various types of artificial reality systems. Artificial reality is a form of reality that has been adjusted in some manner before presentation to a user, that may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of that may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs). Other artificial reality systems may include an NED that also provides visibility into the real world (such as, e.g., augmented-reality system 1500 in FIG. 15) or that visually immerses a user in an artificial reality (such as, e.g., virtual-reality system 1600 in FIG. 16). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 15, augmented-reality system 1500 may include an eyewear device 1502 with a frame 1510 configured to hold a left display device 1515(A) and a right display device 1515(B) in front of a user's eyes. Display devices 1515(A) and 1515(B) may act together or independently to present an image or series of images to a user. While augmented-reality system 1500 includes two displays, embodiments of this disclosure may be implemented in augmented-reality systems with a single NED or more than two NEDs.

In some embodiments, augmented-reality system 1500 may include one or more sensors, such as sensor 1540. In this example, the term sensor may include one or more sensors, such as those described below. Sensor 1540 may generate measurement signals in response to motion of augmented-reality system 1500 and may be located on substantially any portion of frame 1510. Sensor 1540 may represent one or more of a variety of different sensing mechanisms, such as a position sensor, an inertial measurement unit (IMU), a depth camera assembly, a structured light source and/or detector, or any combination thereof. In some embodiments, augmented-reality system 1500 may or may not include sensor 1540 or may include more than one sensor. In embodiments in which sensor 1540 includes an IMU, the IMU may generate calibration data based on measurement signals from sensor 1540. Examples of sensor 1540 may include, without limitation, accelerometers, gyroscopes, magnetometers, other suitable types of sensors that detect motion, sensors used for error correction of the IMU, or some combination thereof.

In some examples, the sensor 1540 may include a camera configured to receive light reflected from an eye, that may include reflected light due to illumination of the eye using an illumination device as described herein. In some examples, there may be one camera per eye. In some examples, a controller may be used to analyze the sensed reflected light, adjust optical system properties accordingly (e.g., adjust the focal length of one or more lenses), adjust augmented or virtual image data, and may also be used to control the operation of light sources or other eye illumination components. The sensor 1540 may include one or more cameras (e.g., image sensors) configured to face the eye, and/or one or more cameras configured to face away from the eye.

In some examples, augmented-reality system 1500 may also include a microphone array with a plurality of acoustic transducers 1520(A)-1520(J), referred to collectively as acoustic transducers 1520. Acoustic transducers 1520 may represent transducers that detect air pressure variations induced by sound waves. Each acoustic transducer 1520 may be configured to detect sound and convert the detected sound into an electronic format (e.g., an analog or digital format). The microphone array in FIG. 16 may include, for example, ten acoustic transducers: 1520(A) and 1520(B), that may be designed to be placed inside a corresponding ear of the user, acoustic transducers 1520(C), 1520(D), 1520(E), 1520(F), 1520(G), and 1520(H), that may be positioned at various locations on frame 1510, and/or acoustic transducers 1520(I) and 1520(J), that may be positioned on a corresponding neckband 1505.

In some embodiments, one or more of acoustic transducers 1520(A)-(F) may be used as output transducers (e.g., speakers). For example, acoustic transducers 1520(A) and/or 1520(B) may be earbuds or any other suitable type of headphone or speaker.

The configuration of acoustic transducers 1520 of the microphone array may vary. While augmented-reality system 1500 is shown in FIG. 15 as having ten acoustic transducers 1520, the number of acoustic transducers 1520 may be greater or less than ten. In some embodiments, using higher numbers of acoustic transducers 1520 may increase the amount of audio information collected and/or the sensitivity and accuracy of the audio information. In contrast, using a lower number of acoustic transducers 1520 may decrease the computing power required by an associated controller 1550 to process the collected audio information. In addition, the position of each acoustic transducer 1520 of the microphone array may vary. For example, the position of an acoustic transducer 1520 may include a defined position on the user, a defined coordinate on frame 1510, an orientation associated with each acoustic transducer 1520, or some combination thereof.

Acoustic transducers 1520(A) and 1520(B) may be positioned on different parts of the user's ear, such as behind the pinna, behind the tragus, and/or within the auricle or fossa. Or, there may be additional acoustic transducers 1520 on or surrounding the ear in addition to acoustic transducers 1520 inside the ear canal. Having an acoustic transducer 1520 positioned next to an ear canal of a user may enable the microphone array to collect information on how sounds arrive at the ear canal. By positioning at least two of acoustic transducers 1520 on either side of a user's head (e.g., as binaural microphones), augmented-reality device 1500 may simulate binaural hearing and capture a 3D stereo sound field around about a user's head. In some embodiments, acoustic transducers 1520(A) and 1520(B) may be connected to augmented-reality system 1500 via a wired connection 1530, and in other embodiments acoustic transducers 1520(A) and 1520(B) may be connected to augmented-reality system 1500 via a wireless connection (e.g., a Bluetooth connection). In still other embodiments, acoustic transducers 1520(A) and 1520(B) may not be used at all in conjunction with augmented-reality system 1500.

Acoustic transducers 1520 on frame 1510 may be positioned in a variety of different ways, including along the length of the temples, across the bridge, above or below display devices 1515(A) and 1515(B), or some combination thereof. Acoustic transducers 1520 may also be oriented such that the microphone array is able to detect sounds in a wide range of directions surrounding the user wearing the augmented-reality system 1500. In some embodiments, an optimization process may be performed during manufacturing of augmented-reality system 1500 to determine relative positioning of each acoustic transducer 1520 in the microphone array.

In some examples, augmented-reality system 1500 may include or be connected to an external device (e.g., a paired device), such as neckband 1505. Neckband 1505 generally represents any type or form of paired device. Thus, the following discussion of neckband 1505 may also apply to various other paired devices, such as charging cases, smart watches, smart phones, wrist bands, other wearable devices, hand-held controllers, tablet computers, laptop computers, other external compute devices, etc.

As shown, neckband 1505 may be coupled to eyewear device 1502 via one or more connectors. The connectors may be wired or wireless and may include electrical and/or non-electrical (e.g., structural) components. In some cases, eyewear device 1502 and neckband 1505 may operate independently without any wired or wireless connection between them. While FIG. 15 illustrates the components of eyewear device 1502 and neckband 1505 in example locations on eyewear device 1502 and neckband 1505, the components may be located elsewhere and/or distributed differently on eyewear device 1502 and/or neckband 1505. In some embodiments, the components of eyewear device 1502 and neckband 1505 may be located on one or more additional peripheral devices paired with eyewear device 1502, neckband 1505, or some combination thereof.

Pairing external devices, such as neckband 1505, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1500 may be provided by a paired device or shared between a paired device and an eyewear device, thus reducing the weight, heat profile, and form factor of the eyewear device overall while still retaining desired functionality. For example, neckband 1505 may allow components that would otherwise be included on an eyewear device to be included in neckband 1505 since users may tolerate a heavier weight load on their shoulders than they would tolerate on their heads. Neckband 1505 may also have a larger surface area over which to diffuse and disperse heat to the ambient environment. Thus, neckband 1505 may allow for greater battery and computation capacity than might otherwise have been possible on a stand-alone eyewear device. Since weight carried in neckband 1505 may be less invasive to a user than weight carried in eyewear device 1502, a user may tolerate wearing a lighter eyewear device and carrying or wearing the paired device for greater lengths of time than a user would tolerate wearing a heavy stand-alone eyewear device, thereby enabling users to more fully incorporate artificial reality environments into their day-to-day activities.

Neckband 1505 may be communicatively coupled with eyewear device 1502 and/or to other devices. These other devices may provide certain functions (e.g., tracking, localizing, depth mapping, processing, storage, etc.) to augmented-reality system 1500. In the embodiment of FIG. 15, neckband 1505 may include two acoustic transducers (e.g., 1520(I) and 1520(J)) that are part of the microphone array (or potentially form their own microphone subarray). Neckband 1505 may also include a controller 1525 and a power source 1535.

Acoustic transducers 1520(I) and 1520(J) of neckband 1505 may be configured to detect sound and convert the detected sound into an electronic format (analog or digital). In the embodiment of FIG. 15, acoustic transducers 1520(I) and 1520(J) may be positioned on neckband 1505, thereby increasing the distance between the neckband acoustic transducers 1520(I) and 1520(J) and other acoustic transducers 1520 positioned on eyewear device 1502. In some cases, increasing the distance between acoustic transducers 1520 of the microphone array may improve the accuracy of beam-forming performed via the microphone array. For example, if a sound is detected by acoustic transducers 1520(C) and 1520(D) and the distance between acoustic transducers 1520(C) and 1520(D) is greater than, for example, the distance between acoustic transducers 1520(D) and 1520(E), the determined source location of the detected sound may be more accurate than if the sound had been detected by acoustic transducers 1520(D) and 1520(E).

Controller 1525 of neckband 1505 may process information generated by the sensors on neckband 1505 and/or augmented-reality system 1500. For example, controller 1525 may process information from the microphone array that describes sounds detected by the microphone array. For each detected sound, controller 1525 may perform a direction-of-arrival (DOA) estimation to estimate a direction from which the detected sound arrived at the microphone array. As the microphone array detects sounds, controller 1525 may populate an audio data set with the information. In embodiments in which augmented-reality system 1500 includes an inertial measurement unit, controller 1525 may compute all inertial and spatial calculations from the IMU located on eyewear device 1502. A connector may convey information between augmented-reality system 1500 and neckband 1505 and between augmented-reality system 1500 and controller 1525. The information may be in the form of optical data, electrical data, wireless data, or any other transmittable data form. Moving the processing of information generated by augmented-reality system 1500 to neckband 1505 may reduce weight and heat in eyewear device 1502, making it more comfortable to the user.

Power source 1535 in neckband 1505 may provide power to eyewear device 1502 and/or to neckband 1505. Power source 1535 may include, without limitation, lithium ion batteries, lithium-polymer batteries, primary lithium batteries, alkaline batteries, or any other form of power storage. In some cases, power source 1535 may be a wired power source. Including power source 1535 on neckband 1505 instead of on eyewear device 1502 may help better distribute the weight and heat generated by power source 1535.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 1600 in FIG. 16, that mostly or completely covers a user's field of view. Virtual-reality system 1600 may include a front rigid body 1602 and a band 1604 shaped to fit around a user's head. Virtual-reality system 1600 may also include output audio transducers 1606(A) and 1606(B). Furthermore, while not shown in FIG. 16, front rigid body 1602 may include one or more electronic elements, including one or more electronic displays, one or more inertial measurement units (IMUS), one or more tracking light sources or detectors, and/or any other suitable device or system for creating an artificial-reality experience.

Artificial reality systems may include a variety of types of visual feedback mechanisms. For example, display devices in augmented-reality system 1500 and/or virtual-reality system 1600 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial reality systems may include a single display screen for both eyes or may provide a display screen for each eye, that may allow for additional flexibility for varifocal adjustments or for correcting a user's refractive error. Some of these artificial reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some the artificial reality systems described herein may include one or more projection systems. For example, display devices in augmented-reality system 1500 and/or virtual-reality system 1600 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial reality systems may also be configured with any other suitable type or form of image projection system, such as retinal projectors used in virtual retina displays.

The artificial reality systems described herein may also include various types of computer vision components and subsystems. For example, augmented-reality system 1500 and/or virtual-reality system 1600 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

The artificial reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial reality systems described herein may also include tactile (i.e., haptic) feedback systems, that may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial reality experience in one or more of these contexts and environments and/or in other contexts and environments.

In some embodiments, the systems described herein may also include an eye-tracking subsystem designed to identify and track various characteristics of a user's eye(s), such as the user's gaze direction, focus, and/or pupil diameter. The phrase "eye tracking" may, in some examples, refer to a process by which the position, orientation, and/or motion of an eye is measured, detected, sensed, determined, and/or monitored. The disclosed systems may measure the position, orientation, and/or motion of an eye in a variety of different ways, including through the use of various optical-based eye-tracking techniques, ultrasound-based eye-tracking techniques, etc. An eye-tracking subsystem may be configured in a number of different ways and may include a variety of different eye-tracking hardware components or other computer-vision components. For example, an eye-tracking subsystem may include a variety of different optical sensors, such as two-dimensional (2D) or 3D cameras, time-of-flight depth sensors, single-beam or sweeping laser rangefinders, 3D LiDAR sensors, and/or any other suitable type or form of optical sensor. In this example, a processing subsystem may process data from one or more of these sensors to measure, detect, determine, and/or otherwise monitor the position, orientation, and/or motion of the user's eye(s).

FIG. 17 is an illustration of an exemplary system 1700 that incorporates an eye-tracking subsystem capable of tracking a user's eye(s). As depicted in FIG. 17, system 1700 may include a light source 1702, an optical subsystem 1704, an eye-tracking subsystem 1706, and/or a control subsystem 1708. In some examples, light source 1702 may generate light for an image (e.g., to be presented to an eye 1701 of the viewer). Light source 1702 may represent any of a variety of suitable devices. For example, light source 1702 can include a two-dimensional projector (e.g., a LCoS display), a scanning source (e.g., a scanning laser), or other device (e.g., an LCD, an LED display, an OLED display, an active-matrix OLED display (AMOLED), a transparent OLED display (TOLED), a waveguide, or some other display capable of generating light for presenting an image to the viewer). In some examples, the image may represent a virtual image, that may refer to an optical image formed from the apparent divergence of light rays from a point in space, as opposed to an image formed from the light ray's actual divergence.

In some embodiments, optical subsystem 1704 may receive the light generated by light source 1702 and generate, based on the received light, converging light 1720 that includes the image. In some examples, optical subsystem 1704 may include any number of lenses (e.g., Fresnel lenses, convex lenses, concave lenses), apertures, filters, mirrors, prisms, and/or other optical components, possibly in combination with actuators and/or other devices. In particular, the actuators and/or other devices may translate and/or rotate one or more of the optical components to alter one or more aspects of converging light 1720. Further, various mechanical couplings may serve to maintain the relative spacing and/or the orientation of the optical components in any suitable combination.

In one embodiment, eye-tracking subsystem 1706 may generate tracking information indicating a gaze angle of an eye 1701 of the viewer. In this embodiment, control subsystem 1708 may control aspects of optical subsystem 1704 (e.g., the angle of incidence of converging light 1720) based at least in part on this tracking information. Additionally, in some examples, control subsystem 1708 may store and utilize historical tracking information (e.g., a history of the tracking information over a given duration, such as the previous second or fraction thereof) to anticipate the gaze angle of eye 1701 (e.g., an angle between the visual axis and the anatomical axis of eye 1701). In some embodiments, eye-tracking subsystem 1706 may detect radiation emanating from some portion of eye 1701 (e.g., the cornea, the iris, the pupil, or the like) to determine the current gaze angle of eye 1701. In other examples, eye-tracking subsystem 1706 may employ a wavefront sensor to track the current location of the pupil.

Any number of techniques can be used to track eye 1701. Some techniques may involve illuminating eye 1701 with infrared light and measuring reflections with at least one optical sensor that is tuned to be sensitive to the infrared light. Information about how the infrared light is reflected from eye 1701 may be analyzed to determine the position(s), orientation(s), and/or motion(s) of one or more eye feature(s), such as the cornea, pupil, iris, and/or retinal blood vessels.

In some examples, the radiation captured by a sensor of eye-tracking subsystem 1706 may be digitized (i.e., converted to an electronic signal). Further, the sensor may transmit a digital representation of this electronic signal to one or more processors (e.g., processors associated with a device including eye-tracking subsystem 1706). Eye-tracking subsystem 1706 may include any of a variety of sensors in a variety of different configurations. For example, eye-tracking subsystem 1706 may include an infrared detector that reacts to infrared radiation. The infrared detector may be a thermal detector, a photonic detector, and/or any other suitable type of detector. Thermal detectors may include detectors that react to thermal effects of the incident infrared radiation.

In some examples, one or more processors may process the digital representation generated by the sensor(s) of eye-tracking subsystem 1706 to track the movement of eye 1701. In another example, these processors may track the movements of eye 1701 by executing algorithms represented by computer-executable instructions stored on non-transitory memory. In some examples, on-chip logic (e.g., an application-specific integrated circuit or ASIC) may be used to perform at least portions of such algorithms. As noted, eye-tracking subsystem 1706 may be programmed to use an output of the sensor(s) to track movement of eye 1701. In some embodiments, eye-tracking subsystem 1706 may analyze the digital representation generated by the sensors to extract eye rotation information from changes in reflections. In one embodiment, eye-tracking subsystem 1706 may use corneal reflections or glints (also known as Purkinje images) and/or the center of the eye's pupil 1722 as features to track over time.

In some embodiments, eye-tracking subsystem 1706 may use the center of the eye's pupil 1722 and infrared or near-infrared, non-collimated light to create corneal reflections. In these embodiments, eye-tracking subsystem 1706 may use the vector between the center of the eye's pupil 1722 and the corneal reflections to compute the gaze direction of eye 1701. In some embodiments, the disclosed systems may perform a calibration procedure for an individual (using, e.g., supervised or unsupervised techniques) before tracking the user's eyes. For example, the calibration procedure may include directing users to look at one or more points displayed on a display while the eye-tracking system records the values that correspond to each gaze position associated with each point.

In some embodiments, eye-tracking subsystem 1706 may use two types of infrared and/or near-infrared (also known as active light) eye-tracking techniques: bright-pupil and dark-pupil eye tracking, that may be differentiated based on the location of an illumination source with respect to the optical elements used. If the illumination is coaxial with the optical path, then eye 1701 may act as a retroreflector as the light reflects off the retina, thereby creating a bright pupil effect similar to a red-eye effect in photography. If the illumination source is offset from the optical path, then the eye's pupil 1722 may appear dark because the retroreflection from the retina is directed away from the sensor. In some embodiments, bright-pupil tracking may create greater iris/pupil contrast, allowing more robust eye tracking with iris pigmentation, and may feature reduced interference (e.g., interference caused by eyelashes and other obscuring features). Bright-pupil tracking may also allow tracking in lighting conditions ranging from total darkness to a very bright environment.

In some embodiments, control subsystem 1708 may control light source 1702 and/or optical subsystem 1704 to reduce optical aberrations (e.g., chromatic aberrations and/or monochromatic aberrations) of the image that may be caused by or influenced by eye 1701. In some examples, as mentioned above, control subsystem 1708 may use the tracking information from eye-tracking subsystem 1706 to perform such control. For example, in controlling light source 1702, control subsystem 1708 may alter the light generated by light source 1702 (e.g., by way of image rendering) to modify (e.g., pre-distort) the image so that the aberration of the image caused by eye 1701 is reduced.

The disclosed systems may track both the position and relative size of the pupil (since, e.g., the pupil dilates and/or contracts). In some examples, the eye-tracking devices and components (e.g., sensors and/or sources) used for detecting and/or tracking the pupil may be different (or calibrated differently) for different types of eyes. For example, the frequency range of the sensors may be different (or separately calibrated) for eyes of different colors and/or different pupil types, sizes, and/or the like. As such, the various eye-tracking components (e.g., infrared sources and/or sensors) described herein may need to be calibrated for each individual user and/or eye.

The disclosed systems may track both eyes with and without ophthalmic correction, such as that provided by contact lenses worn by the user. In some embodiments, ophthalmic correction elements (e.g., adjustable lenses) may be directly incorporated into the artificial reality systems described herein. In some examples, the color of the user's eye may necessitate modification of a corresponding eye-tracking algorithm. For example, eye-tracking algorithms may need to be modified based at least in part on the differing color contrast between a brown eye and, for example, a blue eye.

FIGS. 18A-18B show more detailed illustrations of various aspects of the eye-tracking subsystem illustrated in FIG. 17. As shown in FIG. 18A, an example eye-tracking subsystem 1800 may include at least one source 1804 and at least one sensor 1806. Source 1804 generally represents any type or form of element capable of emitting radiation. In one example, source 1804 may generate visible, infrared, and/or near-infrared radiation. In some examples, source 1804 may radiate non-collimated infrared and/or near-infrared portions of the electromagnetic spectrum towards an eye 1802 of a user. Source 1804 may utilize a variety of sampling rates and speeds. For example, the disclosed systems may use sources with higher sampling rates in order to capture fixational eye movements of a user's eye 1802 and/or to correctly measure saccade dynamics of the user's eye 1802. As noted above, any type or form of eye-tracking technique may be used to track the user's eye 1802, including optical-based eye-tracking techniques, ultrasound-based eye-tracking techniques, etc. Eye-tracking devices, such as optical eye-tracking devices, may include example devices described herein.

In some examples, a controller may adjust the rate of sampling of light reflected from the eye, and/or any intervals between eye illumination, based on previously detected data. For example, if significant eye motion is detected (e.g., the gaze direction changes by over a threshold angle, such as 10 degrees), eye tracking data may be collected at shorter intervals.

Sensor 1806 generally represents any type or form of element capable of detecting radiation, such as radiation reflected off the user's eye 1802. Examples of sensor 1806 include, without limitation, a charge coupled device (CCD), a photodiode array, a complementary metal-oxide-semiconductor (CMOS) based sensor device, and/or the like. In one example, sensor 1806 may represent a sensor having predetermined parameters, including, but not limited to, a dynamic resolution range, linearity, and/or other characteristic selected and/or designed specifically for eye tracking.

As detailed above, eye-tracking subsystem 1800 may generate one or more glints. As detailed above, a glint 1803 may represent reflections of radiation (e.g., infrared radiation from an infrared source, such as source 1804) from the structure of the user's eye. In various embodiments, glint 1803 and/or the user's pupil may be tracked using an eye-tracking algorithm executed by a processor (either within or external to an artificial reality device). For example, an artificial reality device may include a processor and/or a memory device in order to perform eye tracking locally and/or a transceiver to send and receive the data necessary to perform eye tracking on an external device (e.g., a mobile phone, cloud server, or other computing device).

FIG. 18B shows an example image 1805 captured by an eye-tracking subsystem, such as eye-tracking subsystem 1800. In this example, image 1805 may include both the user's pupil 1808 and a glint 1810 near the same. In some examples, pupil 1808 and/or glint 1810 may be identified using an artificial-intelligence-based algorithm, such as a computer-vision-based algorithm. In one embodiment, image 1805 may represent a single frame in a series of frames that may be analyzed continuously in order to track the eye 1802 of the user. Further, pupil 1808 and/or glint 1810 may be tracked over a period of time to determine a user's gaze.

In one example, eye-tracking subsystem 1800 may be configured to identify and measure the inter-pupillary distance (IPD) of a user. In some embodiments, eye-tracking subsystem 1800 may measure and/or calculate the IPD of the user while the user is wearing the artificial reality system. In these embodiments, eye-tracking subsystem 1800 may detect the positions of a user's eyes and may use this information to calculate the user's IPD.

As noted, the eye-tracking systems or subsystems disclosed herein may track a user's eye position and/or eye movement in a variety of ways. In one example, one or more light sources and/or optical sensors may capture an image of the user's eyes. The eye-tracking subsystem may then use the captured information to determine the user's inter-pupillary distance, interocular distance, and/or a 3D position of each eye (e.g., for distortion adjustment purposes), including a magnitude of torsion and rotation (i.e., roll, pitch, and yaw) and/or gaze directions for each eye. In one example, infrared light may be emitted by the eye-tracking subsystem and reflected from each eye. The reflected light may be received or detected by an optical sensor and analyzed to extract eye rotation data from changes in the infrared light reflected by each eye.

The eye-tracking subsystem may use any of a variety of different methods to track the eyes of a user. For example, a light source (e.g., infrared light-emitting diodes) may emit a dot pattern onto each eye of the user. The eye-tracking subsystem may then detect (e.g., via an optical sensor coupled to the artificial reality system) and analyze a reflection of the dot pattern from each eye of the user to identify a location of each pupil of the user. Accordingly, the eye-tracking subsystem may track up to six degrees of freedom of each eye (i.e., 3D position, roll, pitch, and yaw) and at least a subset of the tracked quantities may be combined from two eyes of a user to estimate a gaze point (i.e., a 3D location or position in a virtual scene where the user is looking) and/or an IPD.

In some cases, the distance between a user's pupil and a display may change as the user's eye moves to look in different directions. The varying distance between a pupil and a display as viewing direction changes may be referred to as "pupil swim" and may contribute to distortion perceived by the user as a result of light focusing in different locations as the distance between the pupil and the display changes. Accordingly, measuring distortion at different eye positions and pupil distances relative to displays and generating distortion corrections for different positions and distances may allow mitigation of distortion caused by pupil swim by tracking the 3D position of a user's eyes and applying a distortion correction corresponding to the 3D position of each of the user's eyes at a given point in time. Thus, knowing the 3D position of each of a user's eyes may allow for the mitigation of distortion caused by changes in the distance between the pupil of the eye and the display by applying a distortion correction for each 3D eye position. Furthermore, as noted above, knowing the position of each of the user's eyes may also enable the eye-tracking subsystem to make automated adjustments for a user's IPD.

In some embodiments, a display subsystem may include a variety of additional subsystems that may work in conjunction with the eye-tracking subsystems described herein. For example, a display subsystem may include a varifocal subsystem, a scene-rendering module, and/or a vergence-processing module. The varifocal subsystem may cause left and right display elements to vary the focal distance of the display device. In one embodiment, the varifocal subsystem may physically change the distance between a display and the optics through which it is viewed by moving the display, the optics, or both. Additionally, moving or translating two lenses relative to each other may also be used to change the focal distance of the display. Thus, the varifocal subsystem may include actuators or motors that move displays and/or optics to change the distance between them. This varifocal subsystem may be separate from or integrated into the display subsystem. The varifocal subsystem may also be integrated into or separate from its actuation subsystem and/or the eye-tracking subsystems described herein.

In one example, the display subsystem may include a vergence-processing module configured to determine a vergence depth of a user's gaze based on a gaze point and/or an estimated intersection of the gaze lines determined by the eye-tracking subsystem. Vergence may refer to the simultaneous movement or rotation of both eyes in opposite directions to maintain single binocular vision, that may be naturally and automatically performed by the human eye. Thus, a location where a user's eyes are verged is where the user is looking and is also typically the location where the user's eyes are focused. For example, the vergence-processing module may triangulate gaze lines to estimate a distance or depth from the user associated with intersection of the gaze lines. The depth associated with intersection of the gaze lines may then be used as an approximation for the accommodation distance, that may identify a distance from the user where the user's eyes are directed. Thus, the vergence distance may allow for the determination of a location where the user's eyes may be focused for minimum discomfort, and a depth from the user's eyes at which the eyes are presently focused, thereby providing information (such as an object or plane of focus) for rendering adjustments to the virtual scene.

The vergence-processing module may coordinate with the eye-tracking subsystems described herein to adjust the display subsystem to account for a user's vergence depth. When the user is focused on something at a distance, the user's pupils may be slightly farther apart than when the user is focused on something close. The eye-tracking subsystem may obtain information about the user's vergence or focus depth and may adjust the display subsystem to be closer together when the user's eyes focus or verge on something close and to be farther apart when the user's eyes focus or verge on something at a distance.

The eye-tracking information generated by the above-described eye-tracking subsystems may also be used, for example, to modify various aspect of how different computer-generated images are presented. For example, a display subsystem may be configured to modify, based on information generated by an eye-tracking subsystem, at least one aspect of how the computer-generated images are presented. For instance, the computer-generated images may be modified based on the user's eye movement, such that if a user is looking up, the computer-generated images may be moved upward on the screen. Similarly, if the user is looking to the side or down, the computer-generated images may be moved to the side or downward on the screen. If the user's eyes are closed, the computer-generated images may be paused or removed from the display and resumed once the user's eyes are back open.

The above-described eye-tracking subsystems can be incorporated into one or more of the various artificial reality systems described herein in a variety of ways. For example, one or more of the various components of system 1700 and/or eye-tracking subsystem 1800 may be incorporated into augmented-reality system 1500 in FIG. 15 and/or virtual-reality system 1600 in FIG. 16 to enable these systems to perform various eye-tracking tasks (including one or more of the eye-tracking operations described herein).

As detailed above, the devices and systems described and/or illustrated herein may broadly include any type or form of computing device or system capable of executing computer-readable instructions, such as those contained within the modules described herein. In some configurations, these device(s) may include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although discussed as separate elements, example modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to perform a function, use the result of the transformation to perform a function, and store the result of the transformation to perform a function. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device. In some examples, data may include configuration data related one or both of the user's eye(s) (e.g., external surface profile the cornea, lens focus, gaze direction, gaze time, gaze trajectory, eye accommodation data, pupil diameter, and/or eye vergence data).

In some embodiments, the term "computer-readable medium" may generally refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

What is claimed is:

1. A device, comprising:
    a plurality of illuminators, wherein each illuminator comprises:
        a light source, configured to emit a light beam; and
        an optical element configured to receive the light beam along a first direction and redirect the light beam along a second direction towards a target location, wherein the second direction is different to the first direction; and
        an encapsulant layer,
            wherein for at least one illuminator of the plurality of illuminators:
        the light beam exits the optical element through an exit surface of the optical element into the encapsulant layer;
        the exit surface of the optical element comprises a curved interface between the optical element and the encapsulant layer configured so that the light beam is directed towards the target location;

the optical element comprises a high-index material; and
the high-index material has a refractive index of at least approximately 1.5 at
a wavelength of the light beam.

2. The device of claim 1, wherein the light source comprises a light emitting diode.

3. The device of claim 1, wherein the light source comprises a laser.

4. The device of claim 1, wherein the optical element is at least partially embedded in the encapsulant layer.

5. The device of claim 1, wherein the exit surface of the optical element comprises a curved freeform surface having no rotational symmetry.

6. The device of claim 1, wherein the exit surface of the optical element has an aspheric curvature.

7. The device of claim 6, wherein the aspheric curvature of the exit surface is configured to reduce an illumination uniformity of a target to below 1 standard deviation.

8. The device of claim 1, wherein the high-index material comprises at least one of a semiconductor or a dielectric material.

9. The device of claim 1, wherein the high-index material comprises at least one of an arsenide semiconductor, a phosphide semiconductor, or a nitride semiconductor.

10. The device of claim 1, wherein the high-index material comprises an oxide.

11. The device of claim 1, wherein:
the high-index material has a refractive index of greater than approximately 2 at the wavelength of the light beam, and
the encapsulant layer has an encapsulant refractive index of between approximately 1.3 and approximately 1.8 at the wavelength of the light beam.

12. The device of claim 1, wherein the encapsulant layer comprises an optical polymer.

13. The device of claim 1, wherein the encapsulant layer has an approximately concave exit surface through which the light beam leaves the encapsulant layer.

14. The device of claim 1, wherein the device is at least one of an augmented reality device or a virtual reality device, and the device is configured so that the light beam is positioned to illuminate an eye of an intended user of a device.

15. The device of claim 14, wherein the device comprises a plurality of light sources, including the light source, configured to illuminate the eye of the intended user, and
each light source has an associated optical element embedded within the encapsulant layer.

16. A method, comprising:
generating a light beam using a light source;
receiving, by an optical element, the light beam;
receiving, by an encapsulant layer, the light beam from the optical element, the light beam being refracted by an aspheric curved surface of the optical element into the encapsulant layer; and
illuminating a target using the light beam received from the encapsulant layer, wherein:
the aspheric curved surface of the optical element includes a curved interface between the optical element and the encapsulant layer configured so that the light beam is directed towards the target;
the optical element receives the light beam along a first direction and refracts the light beam into the encapsulant layer along a second direction, wherein the second direction is different to the first direction;
the optical element includes a high-index material having a refractive index of at least 1.5 at a wavelength of the light beam;
the method further comprises illuminating the target using a plurality of light beams;
each light beam of the plurality of light beams is generated by a respective light source of a plurality of light sources; and
the plurality of light sources includes the light source.

17. The method of claim 16, wherein the target comprises an eye.

18. The method of claim 16, further comprising detecting a reflected light beam from the target.

19. The method of claim 16, wherein the method is performed by an augmented reality device or a virtual reality device.

* * * * *